(12) United States Patent
Miki et al.

(10) Patent No.: US 9,862,451 B2
(45) Date of Patent: *Jan. 9, 2018

(54) BICYCLE CONTROL DEVICE

(71) Applicant: Shimano Inc., Sakai, Osaka (JP)

(72) Inventors: Yoshimitsu Miki, Osaka (JP); Kazutaka Fukao, Osaka (JP)

(73) Assignee: Shimano Inc., Osaka (JP)

( * ) Notice: Subject to any disclaimer, the term of this patent is extended or adjusted under 35 U.S.C. 154(b) by 397 days.

This patent is subject to a terminal disclaimer.

(21) Appl. No.: 14/474,615

(22) Filed: Sep. 2, 2014

(65) Prior Publication Data

US 2016/0059925 A1    Mar. 3, 2016

(51) Int. Cl.
*B62K 23/06*    (2006.01)
*B62M 25/04*    (2006.01)

(52) U.S. Cl.
CPC ............ *B62K 23/06* (2013.01); *B62M 25/04* (2013.01)

(58) Field of Classification Search
CPC ................................ B62K 23/06; B62K 21/26
See application file for complete search history.

(56) References Cited

U.S. PATENT DOCUMENTS

| | | | | |
|---|---|---|---|---|
| 4,055,093 A * | 10/1977 | Ross | ................... | B62M 25/045 116/28.1 |
| 4,267,742 A * | 5/1981 | Cabeza | ................ | B62M 25/045 74/471 R |
| 4,279,174 A * | 7/1981 | Ross | ................... | B62M 25/045 280/238 |
| 6,848,335 B1 * | 2/2005 | Kawakami | ............ | B62K 23/06 74/489 |
| 2009/0308194 A1 * | 12/2009 | Shahana | ............... | B62K 23/06 74/502.2 |
| 2013/0081507 A1 * | 4/2013 | Fukao | ................... | B62M 25/04 74/502.2 |
| 2013/0220057 A1 * | 8/2013 | Kawakami | ............ | B62M 25/04 74/501.6 |
| 2015/0210342 A1 * | 7/2015 | Fukao | ................... | B62K 23/06 74/491 |
| 2016/0059933 A1 * | 3/2016 | Miki | ..................... | B62K 23/06 74/502.2 |
| 2017/0274964 A1 * | 9/2017 | Kawakami | ............ | B62M 25/04 |

* cited by examiner

*Primary Examiner* — Vinh Luong
(74) *Attorney, Agent, or Firm* — Global IP Counselors, LLP

(57) ABSTRACT

A bicycle control device is basically provided for operating a first bicycle component and a second bicycle component. The bicycle control device comprises a mounting member, a first actuating unit, a second actuating unit, an operating member and a changing member. The mounting member is configured to be mounted to the bicycle. The first actuating unit is configured to be connected to the first bicycle component. The second actuating unit is configured to be connected to the second bicycle component. The operating member is movably coupled to the mounting member and operatively coupled to the first and second actuating units to selectively operate the first and second actuating units. The changing member is movably coupled to the mounting member to selectively switch between the first and second actuating units being operated in response to movement of the operating member.

20 Claims, 33 Drawing Sheets

BICYCLE CONTROL DEVICE

BACKGROUND

Field of the Invention

This invention generally relates to a bicycle control device. More specifically, the present invention relates to a bicycle control device for operating a first bicycle component and a second bicycle component.

Background Information

Bicycles are often provided with one or more bicycle control devices for controlling various components of the bicycle. Typically, a bicycle control cable interconnects the bicycle control device to a cable operated bicycle component of the bicycle. Most conventional bicycle control cables have, for example, a tubular outer case and an inner wire that can be inserted into and passed through the outer case. The inner wire protrudes beyond both ends of the outer case and each end of the inner wire is connected to either the bicycle control device or the bicycle component. This type of bicycle control cable is often called a Bowden type of bicycle control cable. With this type of bicycle control cable, the bicycle control device pulls and releases the inner wire of the bicycle control cable to change an operating position or state of the bicycle component.

SUMMARY

Generally, the present disclosure is directed to various features of a bicycle control device that selectively operates a first bicycle component and a second bicycle component.

In view of the state of the known technology and in accordance with a first aspect of the present disclosure, a bicycle control device is basically provided for operating a first bicycle component and a second bicycle component. The bicycle control device comprises a mounting member, a first actuating unit, a second actuating unit, an operating member and a changing member. The mounting member is configured to be mounted to the bicycle. The first actuating unit is configured to be connected to the first bicycle component. The second actuating unit is configured to be connected to the second bicycle component. The operating member is movably coupled to the mounting member and operatively coupled to the first and second actuating units to selectively operate the first and second actuating units. The changing member is movably coupled to the mounting member to selectively switch between the first and second actuating units being operated in response to movement of the operating member.

In accordance with a second aspect of the present invention, the bicycle control device according to the first aspect is configured so that the changing member is movably arranged between a first position and a second position, such that the operating member operates the first actuating unit when the changing member is in the first position and operates the second actuating unit while the changing member is in the second position.

In accordance with a third aspect of the present invention, the bicycle control device according to the second aspect is configured so that the changing member is biased towards the first position which corresponds to a rest position of the changing member.

In accordance with a fourth aspect of the present invention, the bicycle control device according to the first aspect is configured so that the first actuating unit includes a first wire take-up member, the second actuating unit includes a second wire take-up member, and the operating member includes a first pulling member arranged to engage the first wire take-up member and a second pulling member arranged to engage the second wire take-up member.

In accordance with a fifth aspect of the present invention, the bicycle control device according to the fourth aspect is configured so that the changing member changes a state of engagement between the first pulling member and the first wire take-up member, and changes a state of engagement between the second pulling member and the second wire take-up member.

In accordance with a sixth aspect of the present invention, the bicycle control device according to the fourth aspect is configured so that the first and second wire take-up members are pivotally mounted with respect to the mounting member about a single pulling axis.

In accordance with a seventh aspect of the present invention, the bicycle control device according to the fourth aspect is configured so that the first and second pulling members are pivotally mounted about a pivot axis and are arranged to pivot independently of each other.

In accordance with an eighth aspect of the present invention, the bicycle control device according to the seventh aspect is configured so that the first pulling member is biased towards the first wire take-up member, and the second pulling member is biased away from the second wire take-up member.

In accordance with a ninth aspect of the present invention, the bicycle control device according to the eighth aspect is configured so that the changing member includes a cam member that pivots the first and second pulling members in opposite directions about the pivot axis upon operation of the changing member.

In accordance with a tenth aspect of the present invention, the bicycle control device according to the fourth aspect is configured so that the changing member includes a cam member that engages and moves the first and second pulling members upon operation of the changing member.

In accordance with an eleventh aspect of the present invention, the bicycle control device according to the fourth aspect is configured so that the changing member and the first and second wire take-up members are pivotally mounted about a single pulling axis.

In accordance with a twelfth aspect of the present invention, the bicycle control device according to the sixth aspect is configured so that the operating member comprises a first lever member pivotally mounted about the pulling axis, and the changing member comprises a second lever member pivotally mounted about an axis that is offset from and parallel to the pulling axis.

In accordance with a thirteenth aspect of the present invention, the bicycle control device according to the twelfth aspect is configured so that the first and second lever members extend toward an end of a handlebar along longitudinal direction of the handlebar. The second lever member is longer than the first lever member in a state in which the mounting member is mounted to the handlebar.

In accordance with a fourteenth aspect of the present invention, the bicycle control device according to the eleventh aspect is configured so that the changing member includes a cam member that engages and moves the first and second pulling members upon operation of the second lever member.

In accordance with a fifteenth aspect of the present invention, the bicycle control device according to the fourteenth aspect is configured so that the changing member is pivotally mounted about the pulling axis.

In accordance with a sixteenth aspect of the present invention, the bicycle control device according to the first aspect is configured so that the first actuating unit is configured to be connected to a derailleur as the first bicycle component, and the second actuating unit is configured to be connected to one of a suspension adjustment mechanism and a height adjustable seatpost as the second bicycle component.

In accordance with a seventeenth aspect of the present invention, the bicycle control device according to the first aspect is configured so that the first actuating unit is configured to be connected to the first bicycle component via a control cable, and the operating member is configured to operate the first actuating unit to pull and release the control cable.

In accordance with an eighteenth aspect of the present invention, the bicycle control device according to the first aspect is configured so that the operating member is configured to operate the first and second actuating units to selectively operate the first and second actuating units upon movement of the operating member in a first direction.

In accordance with a nineteenth aspect of the present invention, a bicycle control device is basically provided for operating a first bicycle component and a second bicycle component. The bicycle control device comprises a mounting member, a first actuating unit, a second actuating unit and an operating member. The mounting member is configured to be mounted to the bicycle. The first actuating unit is configured to be connected to the first bicycle component via a control cable. The second actuating unit is configured to be connected to the second bicycle component. The operating member is movably coupled to the mounting member and operatively coupled to the first and second actuating units to selectively operate the first and second actuating units. The operating member is configured to operate the first actuating unit to pull and release the control cable.

In accordance with a twentieth aspect of the present invention, a bicycle control device is basically provided for operating a first bicycle component and a second bicycle component. The bicycle control device comprises a mounting member, a first actuating unit, a second actuating unit and an operating member. The mounting member is configured to be mounted to the bicycle. The first actuating unit is configured to be connected to the first bicycle component via a control cable. The second actuating unit is configured to be connected to the second bicycle component. The operating member is pivotally coupled to the mounting member and operatively coupled to the first and second actuating units to selectively operate the first and second actuating units upon movement of the operating member in a first direction.

Also other objects, features, aspects and advantages of the disclosed bicycle control device will become apparent to those skilled in the art from the following detailed description, which, taken in conjunction with the annexed drawings, discloses one illustrative embodiment of the bicycle control device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
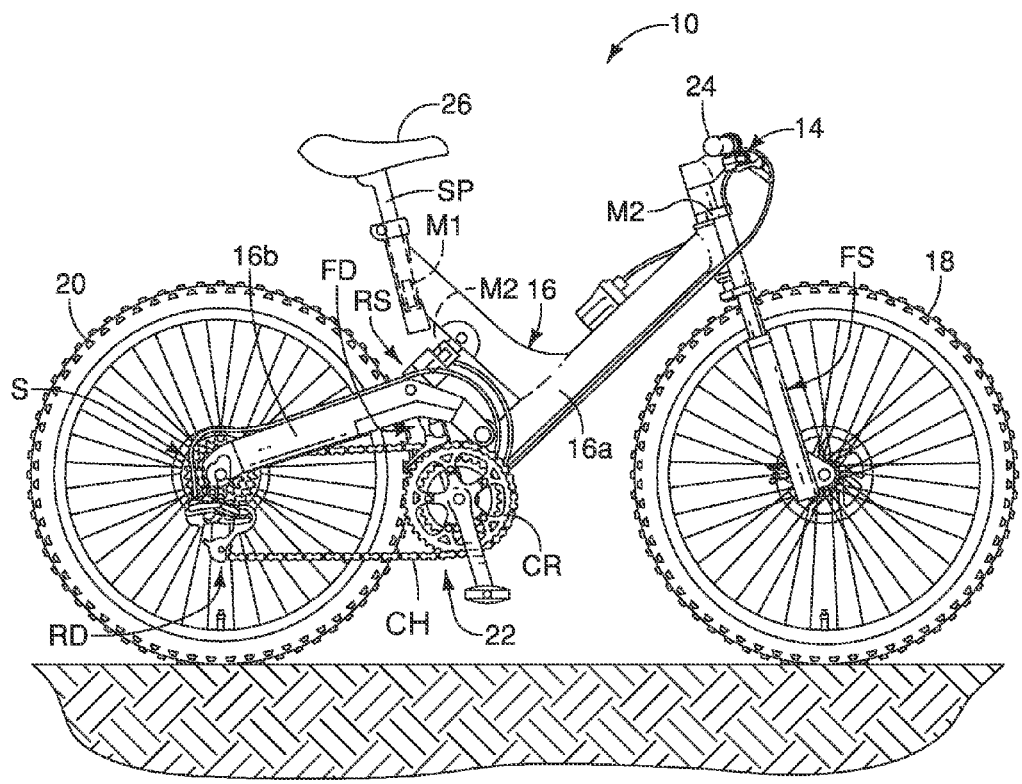
FIG. 1 is a side elevational view of a bicycle that is equipped with a pair of bicycle control devices in accordance with one illustrated embodiment.
Figure 2:
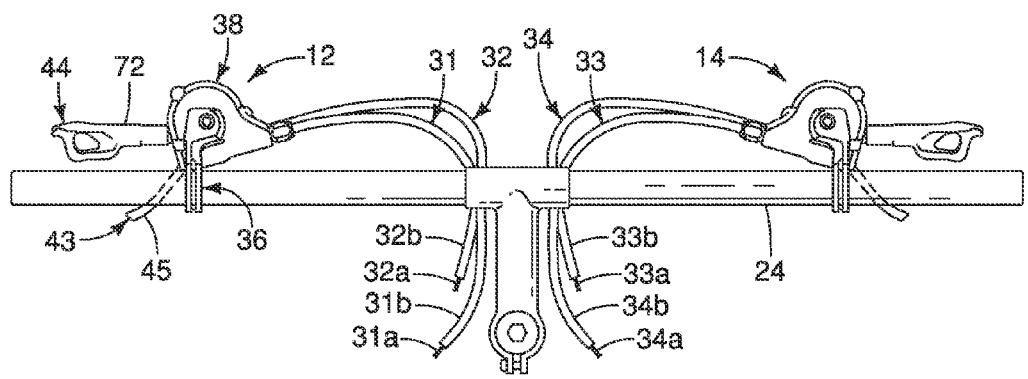
FIG. 2 is an enlarged top view of a handlebar area of the bicycle illustrated in FIG. 1 with the bicycle control devices mounted to the handlebar of the bicycle.

Referring initially to FIGS. 1 and 2, a bicycle 10 is illustrated that is equipped with a pair of bicycle control devices 12 and 14 in accordance with a first embodiment. The bicycle 10 is, for example, a mountain bike. The bicycle 10 has a bicycle frame 16 having a front wheel 18, a rear wheel 20 and a drivetrain 22. The frame 16 comprises a frame main body 16a and a swing arm 16b. The swing arm 16b is coupled to a rear section of the frame main body 16a such that the swing arm 16b can pivot freely. A front suspension fork FS is pivotally mounted to a head tube of the frame main body 16a. A handlebar 24 is mounted to an upper end of a steerer tube of the front suspension fork FS. The front wheel 18 is mounted to the lower end of the front suspension fork FS. The rear wheel 20 is mounted to a rear end of the swing arm 16b. A rear suspension RS is provided between the frame main body 16a and the swing arm 16b. A height adjustable seatpost SP is attached to a seat tube of the frame main body 16a. Also, a bicycle seat 26 is mounted on top of the seatpost SP in any suitable manner. The drivetrain 22 includes a front derailleur FD for selectively shifting a chain CH between front chainrings CR, and a rear derailleur RD for selectively shifting the chain CH between rear sprockets S.

As seen in FIG. 2, the bicycle control devices 12 and 14 are mounted on opposite ends of the handlebar 24. The bicycle control device 12 is basically provided for operating a first bicycle component and a second bicycle component. Likewise, the bicycle control device 14 is provided for operating a first bicycle component and a second bicycle component. For example, in the illustrated embodiment, the bicycle control device 12 is configured to operate the front derailleur FD as a first bicycle component and to operate the seatpost SP as a second bicycle component. Likewise, for example, in the illustrated embodiment, the bicycle control device 14 is configured to operate the rear derailleur RD as a first bicycle component and to operate the rear suspension RS as a second bicycle component. Further, a combination of the first bicycle component and the second bicycle component can be chosen from any kind of bicycle components such as the front derailleur FD, the rear derailleur RD, the seatpost SP, the front suspension fork FS and so on. However, the bicycle control devices 12 and 14 do not need to be configured to operate two bicycle components. For example, in accordance with certain aspects of the present invention, the bicycle control device 12 can be provided for operating a single bicycle component such as the front derailleur FD. In other words, the bicycle control device 12 can be configured to achieve certain aspects of the present invention, and not achieve other aspects of the present invention if needed and/or desired.

In the illustrated embodiment, the bicycle control device 12 is operatively coupled to the front derailleur FD via a first control cable 31 and to either the seatpost SP, or one of the front and rear suspensions FS and RS via a second control cable 32. The bicycle control device 14 is operatively coupled to the rear derailleur RD via a third control cable 33 and to either the seatpost SP, or one of the front and rear suspensions FS and RS via a fourth control cable 34. Of course, it will be apparent to those skilled in the bicycle field from this disclosure that the bicycle control devices 12 and 14 can be used to control other combinations of bicycle components. For example, the second control cable 32 can be connect both of the front and rear suspensions FS and RS such that the control device 12 controls the front derailleur FD and both of the front and rear suspensions FS and RS.

The seatpost SP is removably received in a seat tube of the frame main body 16a. The seatpost SP can be any suitable type of adjustable seatpost as understood in the bicycle field. For example, the seatpost SP can be adjustable in height either electrically, hydraulically or a pneumatically. For example, in the illustrated embodiment, the seatpost SP is an electric seatpost having an actuating mechanism M1, such as a reversible electric motor and a solenoid, or other suitable actuator. The operating state of the seatpost SP can be changed by operating a switch, a valve or a controller of the actuator of the seatpost SP using the second control cable 32. The operating state of a seatpost is also called a "positioning state" of the seatpost.

Preferably, the front and rear suspensions FS and RS are configured such that they can assume one of two operating states: a free state and a locked state. In the free state, the suspension can expand and contract. The term "a locked state" in which a suspension cannot expand and contract, as used herein, encompasses a state in which a suspension is prohibited from expanding and contracting but still may expand and contract in a limited situation e.g. by a separate blow-off structure as well as a state in which a suspension is completely prohibited from expanding and contracting. The free state is also called a "lock-released state." The operating state of a suspension is also called a "setting state" of the suspension. The front suspension FS and the rear suspension RS are configured such that the operating states thereof can be controlled using electricity. Each of the front suspension FS and the rear suspension RS includes a suspension adjustment mechanism M2 such as a motor and a solenoid, or other suitable actuator. The operating state of the front suspension FS or the rear suspension RS can be changed by operating the actuator of the front suspension FS or the rear suspension RS to control a valve provided inside the front suspension FS or the rear suspension RS.

Preferably, the control cables 31 to 34 are conventional bicycle control cables that have an outer casing covering an inner wire. In other words, each of the shift control cables 31 to 34 is a Bowden type cable that basically includes an inner wire slidably received within an outer casing. For example, as seen in FIG. 2, the first control cable 31 has an inner wire 31a with an outer casing 31b covering the inner wire 31a. The second control cable 32 has an inner wire 32a with an outer casing 32b covering the inner wire 32a. The third control cable 33 has an inner wire 33a with an outer casing 33b covering the inner wire 33a. The fourth control cable 34 has an inner wire 34a with an outer casing 34b covering the inner wire 34a.

Also in the illustrated embodiment, the bicycle control devices 12 and 14 are essentially identical in operation, except that they are mirror images of each other, and they may have a different number of shift operations. In other words, the bicycle control device 12 is identical to the bicycle control device 14, except for the bicycle control device 14 has been modified to be a mirror image and the number of gears that can be shifted has been changed to accommodate the number of the rear sprockets S. Thus, for the sake of brevity, only the bicycle control device 12 will be discussed and illustrated herein.

Figure 3:
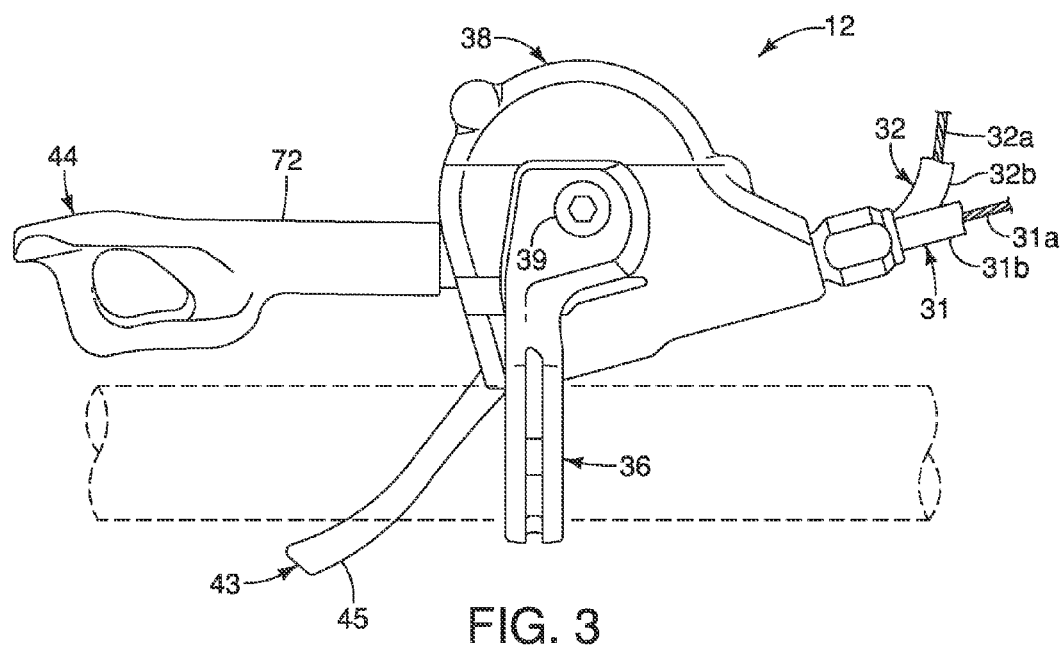
FIG. 3 is a further enlarged top view of the left bicycle control device mounted to the left end of the handlebar of the bicycle.
Figure 4:
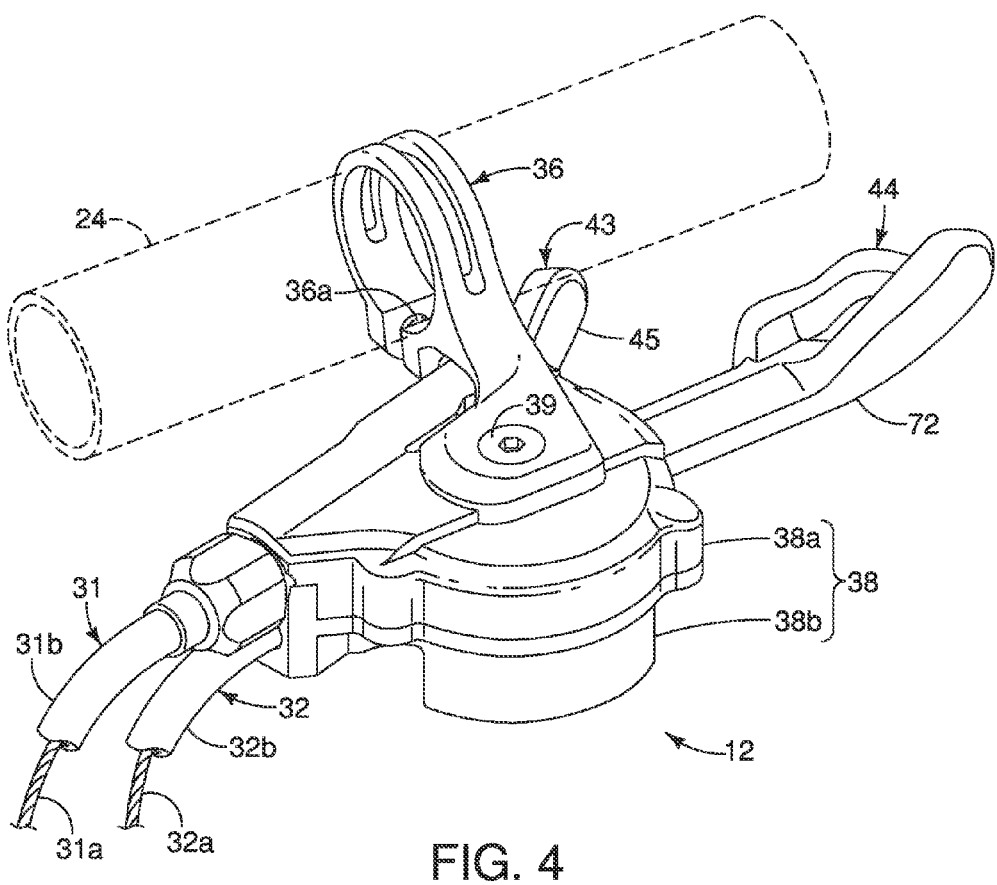
FIG. 4 is a perspective view of the left bicycle control device that is mounted to the left end of the handlebar of the bicycle.

As seen in FIGS. 3 and 4, the bicycle control device 12 comprises a mounting member 36. The mounting member 36 is configured to be mounted to the bicycle 10. In particular, the mounting member 36 is configured to be mounted to the handlebar 24 of the bicycle 10. Thus, the mounting member 36 constitutes an example of a handlebar mounting member. Here, the mounting member 36 includes a tightening bolt 36a or other tightening member to form a tube clamp that is configured to squeeze the mounting member 36 onto the handlebar 24.

Figure 5:
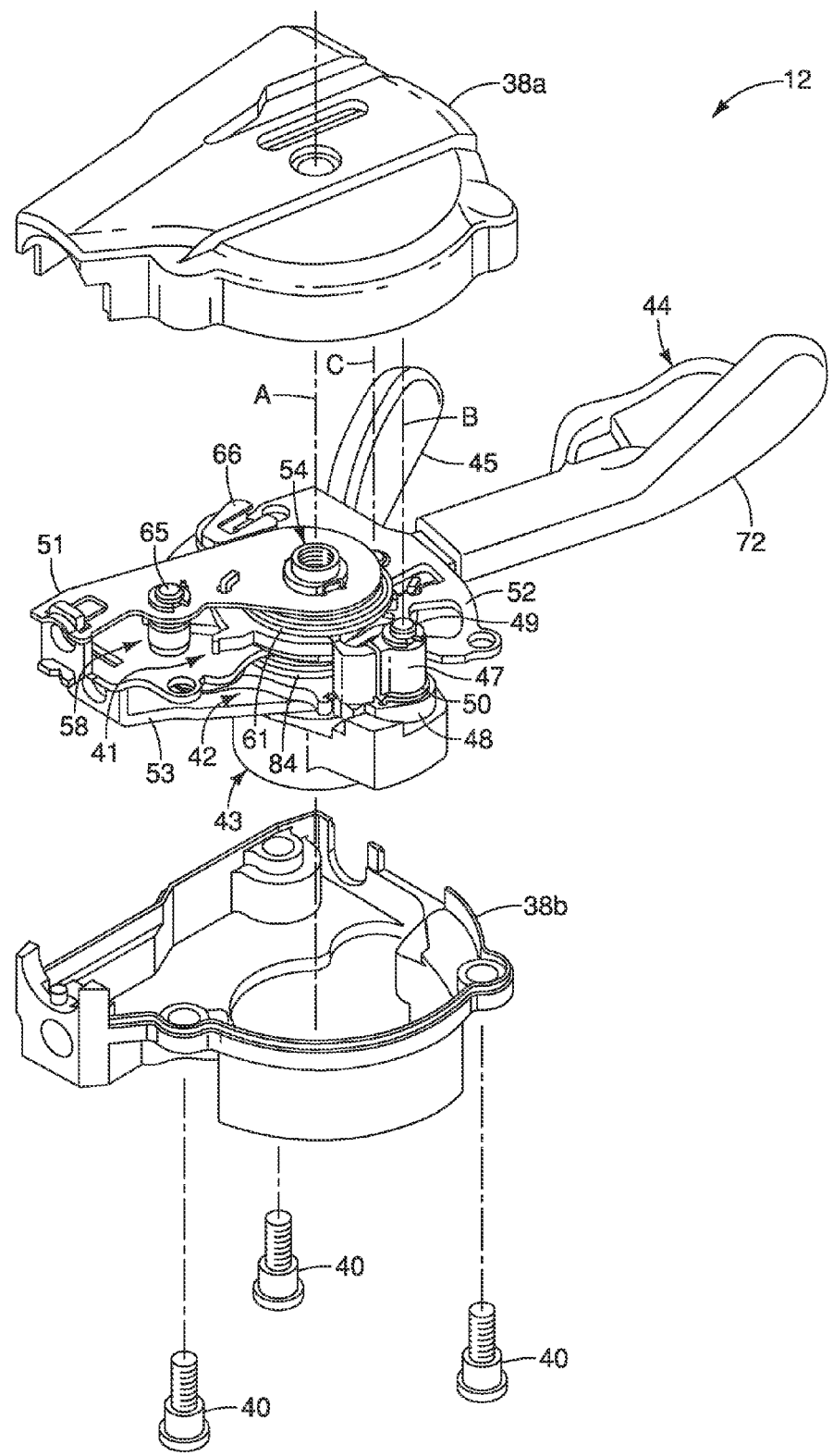
FIG. 5 is a partial exploded perspective view of the bicycle control device illustrated in FIGS. 3 and 4.

As seen in FIGS. 4 and 5, the bicycle control device 12 further comprises a housing 38. The mounting member 36 is fixed to the housing 38 by a screw 39. The housing 38 covers the internal parts of the bicycle control device 12. The housing 38 also supports the internal parts of the bicycle control device 12 on the mounting member 36. Here, the housing 38 has a two-piece construction having a first housing part 38a and a second housing part 38b. The first housing part 38a and a second housing part 38b are fastened together by three screws 40. However, the housing 38 is not limited to the illustrated configuration. Rather, the housing 38 can have a variety of configurations as needed and/or desired.

Figure 6:
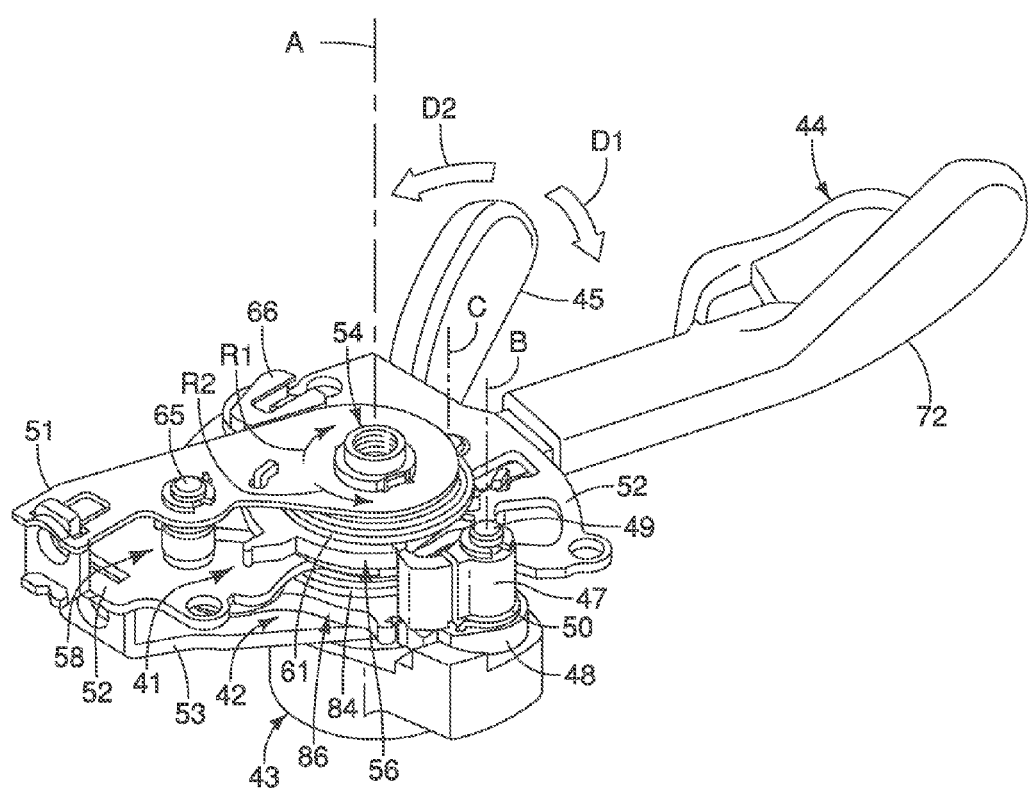
FIG. 6 is an enlarged perspective view of the internal parts of the bicycle control device illustrated in FIGS. 3 and 4.
Figure 7:
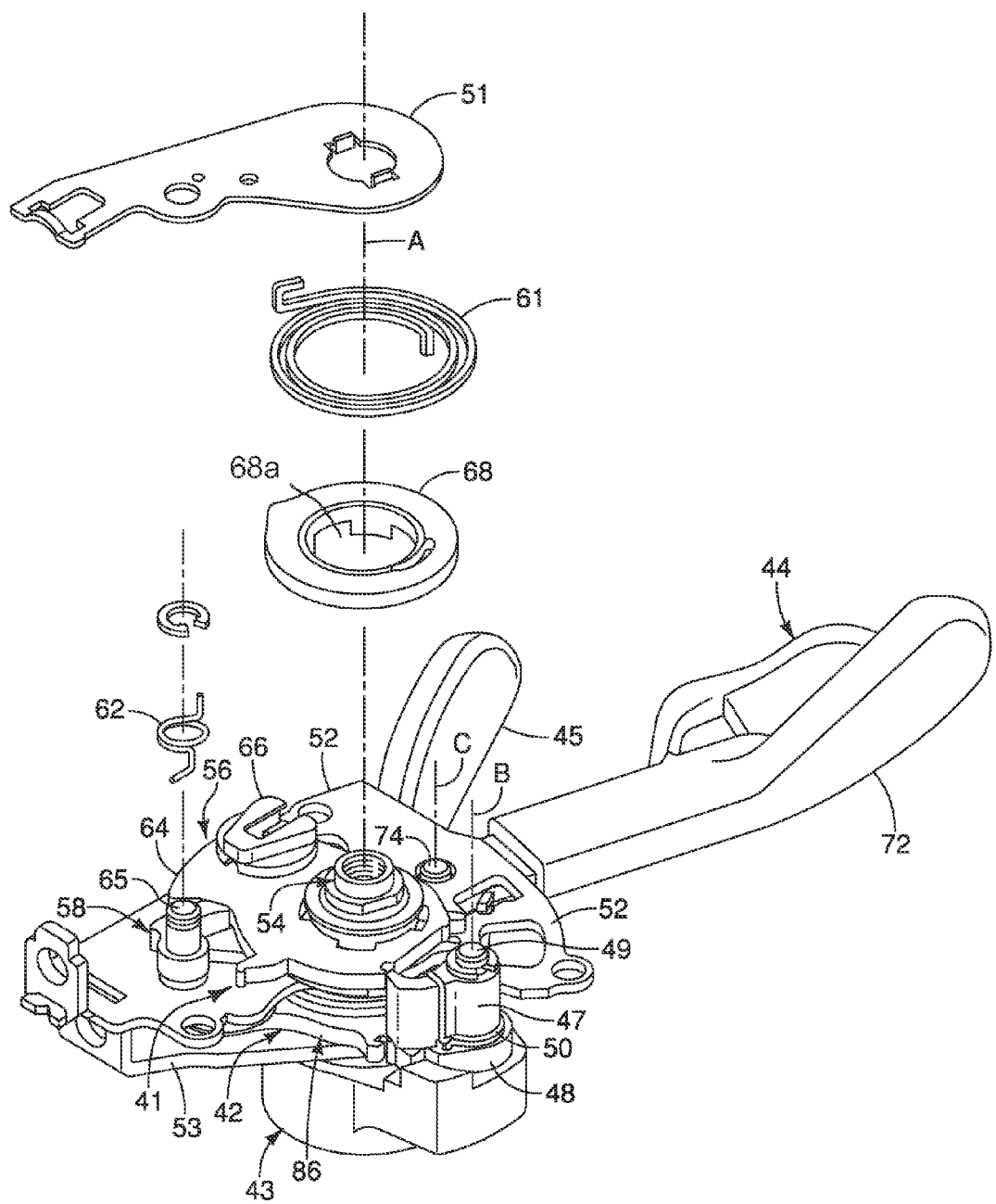
FIG. 7 is a partial exploded perspective view of the internal parts of the bicycle control device illustrated in FIG. 6.
Figure 8:
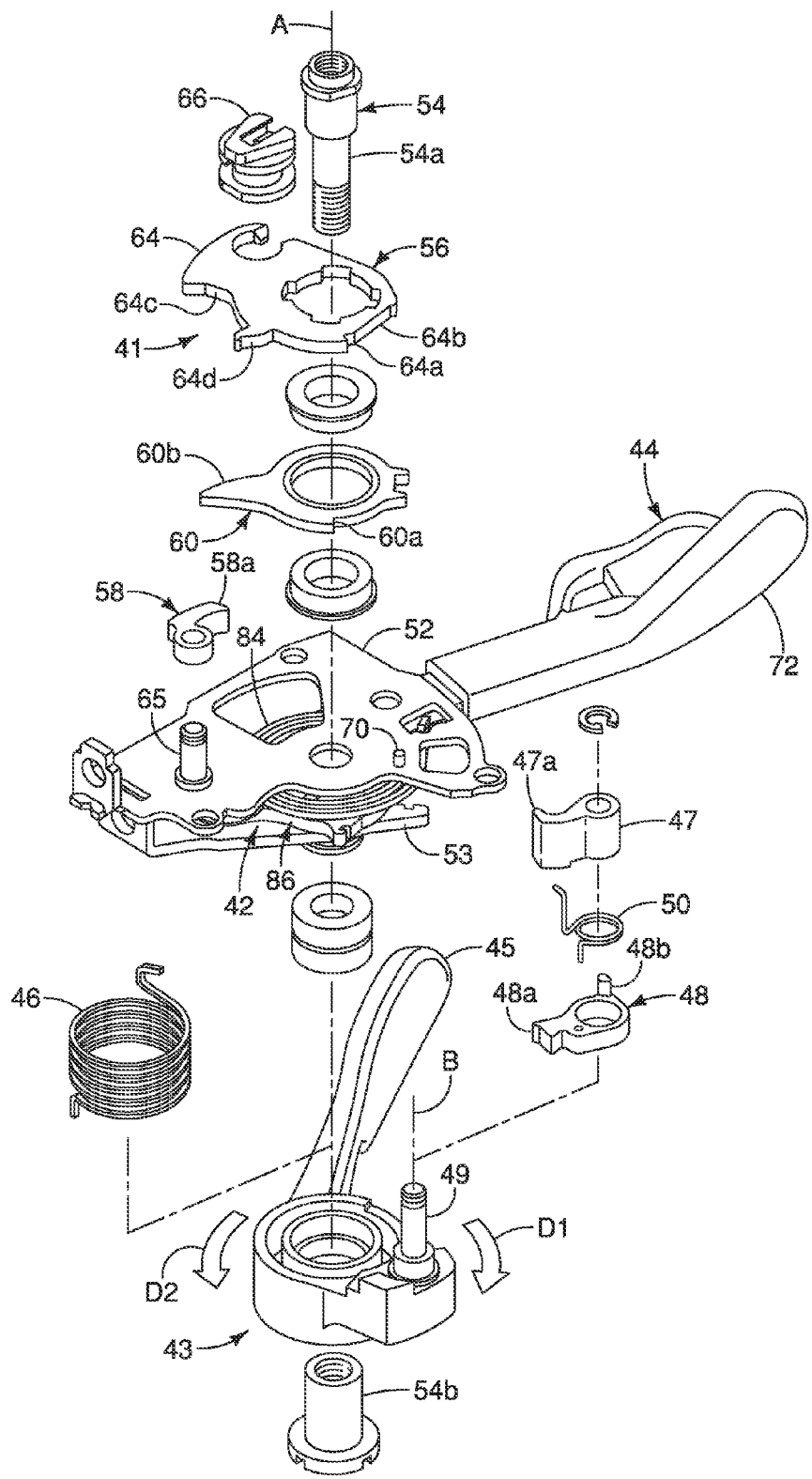
FIG. 8 is a further partial exploded perspective view of the internal parts of the bicycle control device illustrated in FIGS. 6 and 7 with selected parts removed.
Figure 9:
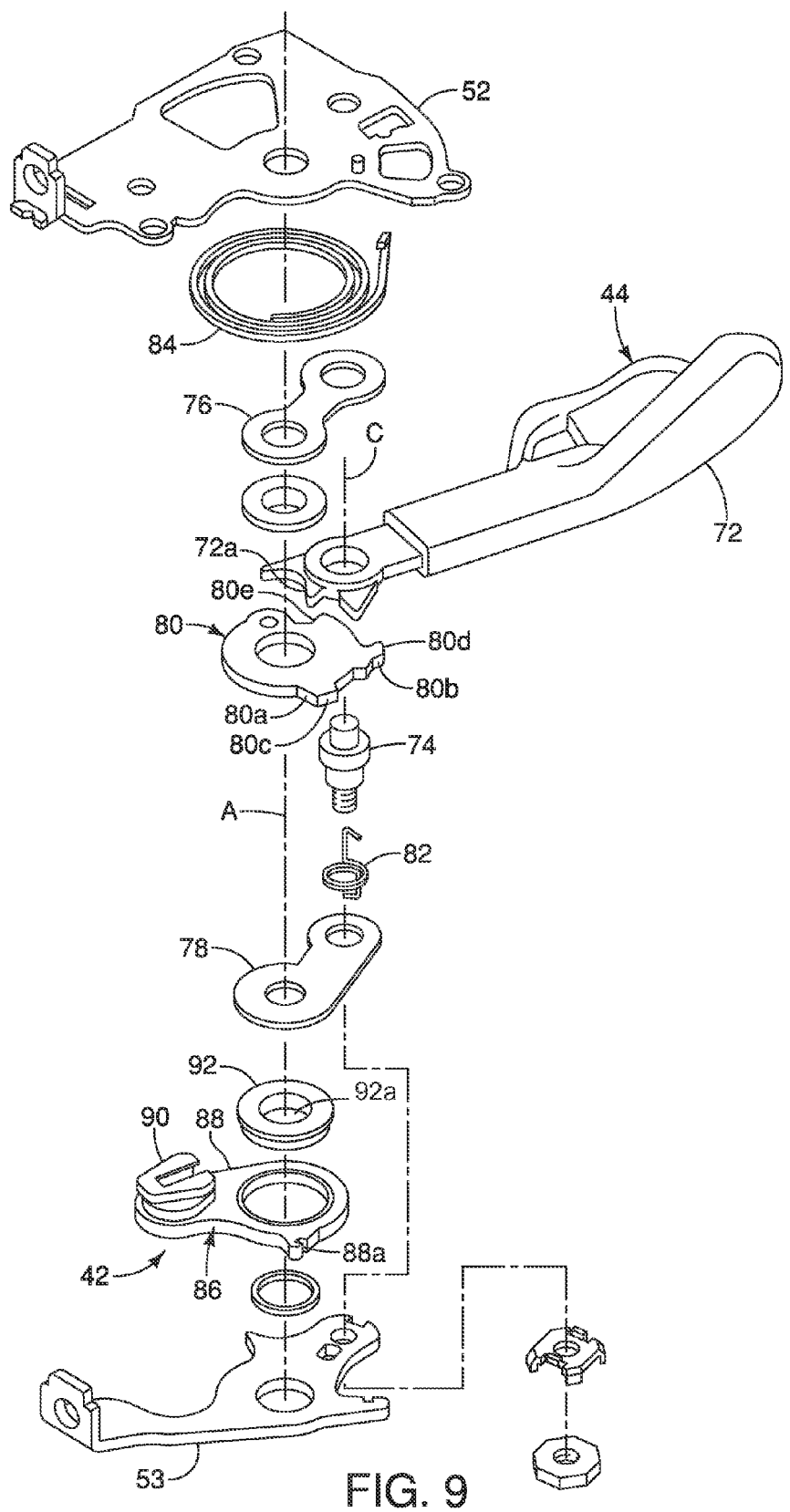
FIG. 9 is yet a further partial exploded perspective view of the internal parts of the bicycle control device illustrated in FIGS. 6 to 8 with selected parts removed.
Figure 10:
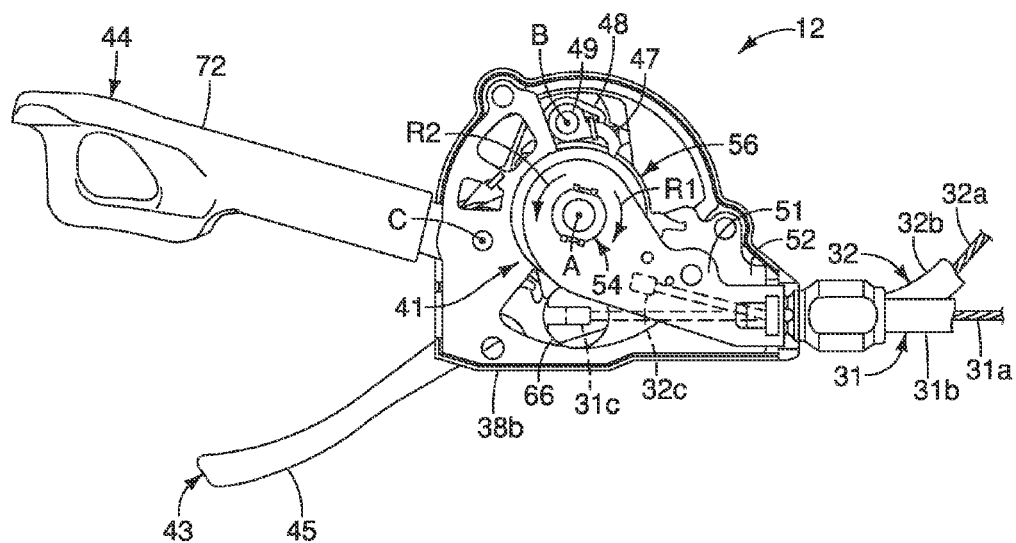
FIG. 10 is a top view of the bicycle control device illustrated in FIGS. 3 and 4 with the top housing part of the housing removed to illustrate selected parts of the internal parts of the bicycle control device in their rest positions.
Figure 11:
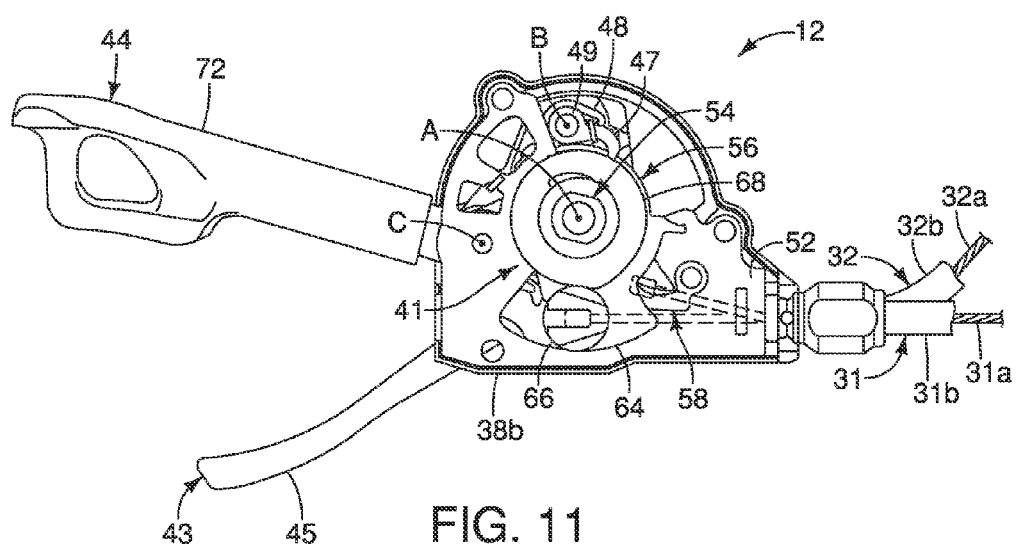
FIG. 11 is another top view, similar to FIG. 10, of the bicycle control device illustrated in FIGS. 3 and 4, but with selected parts removed to more clearly show the first wire take-up member and the position maintaining member.

Referring to FIGS. 6 to 9, in the illustrated embodiment, the bicycle control device 12 further comprises a first actuating unit 41 (FIGS. 6 to 8), a second actuating unit 42 (FIG. 9) and an operating member 43 (FIGS. 6 to 8). The first actuating unit 41 is configured to be connected to the first bicycle component via the first control cable 31. The second actuating unit 42 is configured to be connected to the second bicycle component via the second control cable 32. Thus, in the illustrated embodiment, the first actuating unit 41 is configured to be connected to the front derailleur FD as the first bicycle component, and the second actuating unit 42 is configured to be connected to one of the suspension adjustment mechanism M2 and the height adjustable seatpost SP as the second bicycle component.

As the explained below in greater detail, the operating member 43 is a user operating member that the rider can use to selectively operate the first and second actuating units 41 and 42. In particular, the bicycle control device 12 further comprises a changing member 44 for switching which one of the first and second actuating units 41 and 42 is operated as the operating member 43 is moved. In other words, the changing member 44 is movably coupled to the mounting member 36 to selectively switch between the first and second actuating units 41 and 42 being operated in response to movement of the operating member 43. The changing member 44 is movably arranged between a first position (FIGS. 16 to 19, 47 and 48) and a second position (FIGS. 49 to 51). In this way, the operating member 43 operates the first actuating unit 41 when the changing member 44 is in the first position (FIGS. 16 to 19, 47 and 48) and operates the second actuating unit 42 while the changing member 44 is in the second position (FIGS. 49 to 51). Alternatively, the second actuating unit 42 and the changing member 44 can be omitted if only the features of the first actuating unit 41 are needed and/or desired. The second actuating unit 42 and the changing member 44 will be discussed below in greater detail.

Referring to FIGS. 6 to 8, the operating member 43 is pivotally coupled to the mounting member 36. The operating member 43 is operatively coupled to the first and second actuating units 41 and 42 to selectively operate the first and second actuating units 41 and 42 upon movement of the operating member 43 in a first direction D1. The operating member 43 is configured to operate the first actuating unit 41 to pull and release the first control cable 31. The operating member 43 comprises a first lever member 45 that is pivotally mounted about a pulling (take-up) axis A. The first lever member 45 is movably disposed with respect to the mounting member 36 between a non-operated position and an operated position. In particular, the first lever member 45 is pivotally disposed with respect to the mounting member 36 about the pulling axis A between the non-operated position and the operated position. As seen in FIG. 8, a return spring 46 or other biasing element is operatively coupled between the first lever member 45 and a stationary part of the bicycle control device 12 for biasing the first lever member 45 in a second direction D2 towards the non-operated position, which is a rest position of the first lever member 45. In this way, the first lever member 45 is a trigger lever that returns to the non-operated position after being pivoted from the non-operated position to an operated position and then released.

The term "rest position" as used herein refers to a state in which a movable part (e.g., the first lever member 45) remains stationary without the need of a user intervening (e.g., holding the movable part) in the state corresponding to the rest position. Thus, the term "rest position" can also be referred to as a non-operated position. The term "end position" as used herein refers a state in which a movable part (e.g., the first lever member 45) is prevent from be moved further from the rest position in a movement direction of a movement stroke of that movable part. The term "operated position" as used herein refers to a state in which a movable part (e.g., the first lever member 45) is moved from the rest position to a position as a result of an external force being applied to the movable part.

As seen in FIGS. 6 to 8, in the illustrated embodiment, the operating member 43 further comprises a first pulling member 47 for operate the first actuating unit 41 to selectively pull or release the first control cable 31. Also in the illustrated embodiment, the operating member 43 further comprises a second pulling member 48 for operate the second actuating unit 42 to pull the second control cable 32. The first and second pulling members 47 and 48 are each pivotally mounted about a pivot axis B, and are arranged to pivot independently of each other. In other words, the first and second pulling members 47 and 48 are configured to pivot about a same or a common pivot axis B disposed on the operating member 43. The first lever member 45 has the first pulling member 47 disposed thereon. Likewise, the first lever member 45 has the second pulling member 48 disposed thereon. In particular, the first and second pulling members 47 and 48 are pivotally mounted on the first lever member 45 by a pivot axle 49. The pivot axle 49 defines the pivot axis B. The first and second pulling members 47 and 48 are pawls that are pivotally mounted on the pivot axle 49. The first pulling member 47 has an abutment or tooth 47a, which will be discussed later. The second pulling member 48 has an abutment or tooth 48*a* and a projection 48*b*. The tooth 48*a* and the projection 48*b* will be discussed later.

As seen in FIGS. 6 to 8, a spring 50 or other biasing element is coupled between the first and second pulling members 47 and 48. The spring 50 biases the first pulling member 47 towards engagement with the first actuating unit 41. The spring 50 also biases the second pulling member 48 away from engagement with the second actuating unit 42. Here in the illustrated embodiment, as seen in FIG. 8, the spring 50 is a torsion spring that biases the first and second pulling members 47 and 48 in opposite directions about the pivot axis B. Upon operating the first lever member 45 from the non-operated position towards its operated position, the first pulling member 47 operates the first actuating unit 41 to selectively either pull or release the first control cable 31 depending on the current state of the first actuating unit 41.

As explained below and seen in FIGS. 47 to 57, the second actuating unit 42 is operated by moving the changing member 44 from a rest or first position to a second position, and then subsequently operating the first lever member 45 with the changing member 44 held in the second position. Thus, as a result of the operation of the changing member 44, the first pulling member 47 is disengaged from the first actuating unit 41 so that operation of the first lever member 45 operates not the first actuating unit 41 but the second actuating unit 42. As explained below, the first lever member 45 pulls the second control cable 32 as the first lever member 45 is operated from the non-operated position to the operated position and then returned to the non-operated position in a single progressive operation of the first lever member 45 from the non-operated position to the operated position. Thus, the operating member 43 is configured to operate the first and second actuating units 41 and 42 to selectively operate the first and second actuating units 41 and 42 upon movement of the first lever member 45 of the operating member 43 in the first direction D1.

Here in the illustrated embodiment, as seen in FIGS. 6 to 9, the bicycle control device 12 further comprises an internal support structure that includes a first stationary support plate 51, a second stationary support plate 52, a third stationary support plate 53 and a first axle 54. The stationary support plates 51 to 53 and the first axle 54 support the various parts of the first and second actuating units 41 and 42 within the housing 38. The first axle 54 extends through the stationary support plates 51, 52 and 53. In the illustrated embodiment, the first axle 54 is formed by a bolt 54*a* and a nut 54*b* that is screwed onto one threaded end of the bolt 54*a* for fixing various parts of the first and second actuating units 41 and 42 on the stationary support plates 51, 52 and 53. The first axle 54 defines the pulling axis A. The first axle 54 is provided with various washers and bushings to aid in supporting and smooth movement of the first and second actuating units 41 and 42. Since the washers and bushings are conventional structures that are commonly used in bicycle control device to aid in supporting and smooth movement of the parts, the washers and bushings will not be discussed and/or illustrated for the sake of brevity.

Here in the illustrated embodiment, as seen in FIG. 8, the return spring 46 of the first lever member 45 is a torsion spring. The return spring 46 has a coiled portion that coils around the first axle 54, and is disposed in an annular recess of the first lever member 45. The return spring 46 has one end disposed in a hole in the first lever member 45 and the other end hooked on to the third stationary support plate 53 to bias the first lever member 45 in the second direction D2 with respect to the pulling axis A towards the non-operated position, which is a rest position. In this way, as mentioned above, the first lever member 45 returns to the non-operated position after being pivoted from the non-operated position to the operated position and then released.

Referring now to FIGS. 7, 8 and 11 to 46, the first actuating unit 41 of the bicycle control device 12 will now be discussed in greater detail. In the illustrated embodiment, as seen in FIGS. 7 and 8, the first actuating unit 41 of the bicycle control device 12 comprises a first wire take-up member 56, a position maintaining member 58 and a release member 60. The first wire take-up member 56 pivots about pulling axis A to pull or wind the first control cable 31 on the first wire take-up member 56, or to release or unwind the first control cable 31 from the first wire take-up member 56. Thus, the first wire take-up member 56 moves with respect to the mounting member 36 in a take-up direction R1 for pulling or winding the first control cable 31 and a releasing direction R2 for releasing or unwinding the first control cable 31 in response to movement of the first lever member 45.

The first wire take-up member 56 and the release member 60 are coaxially arranged for pivotal movement with respect to the mounting member 36 about the pulling axis A. The first pulling member 47 is arranged to engage the first wire take-up member 56 and the release member 60. The first pulling member 47 selectively moves each one of the first wire take-up member 56 and the release member 60 individually with respect to each other. In this way, while the first wire take-up member 56 is moved by the first pulling member 47 in the take-up direction, the release member 60 remains stationary. Also, while the release member 60 is moved by the first pulling member 47, the first wire take-up member 56 moves in the releasing direction. Preferably, as seen in FIG. 7, the first actuating unit 41 further comprises a first biasing element 61 for biasing the first wire take-up member 56 towards a rest position of the first wire take-up member 56 in which the first control cable 31 is released (unwound). Preferably, as seen in FIG. 7, the first actuating unit 41 further comprises a second biasing element 62 for biasing the position maintaining member 58 about its pivot axis towards engagement with the first wire take-up member 56.

As explained below, the first wire take-up member 56 pulls and releases the first control cable 31 for operating a first bicycle component (e.g., the front derailleur FD) in response to operation of the first lever member 45. Basically, the first wire take-up member 56 is pivotally mounted to the housing 38 about the pulling axis A that is defined by the first axle 54. Basically, the position maintaining member 58 holds or maintains the first wire take-up member 56 in at least one operated position against a biasing force of the first biasing element 61. On the other hand, the release member 60 basically releases the first wire take-up member 56 for pivotal movement about the pulling axis A by moving the position maintaining member 58 out of engagement from the first wire take-up member 56 against a biasing force of the second biasing element 62.

Figure 28:
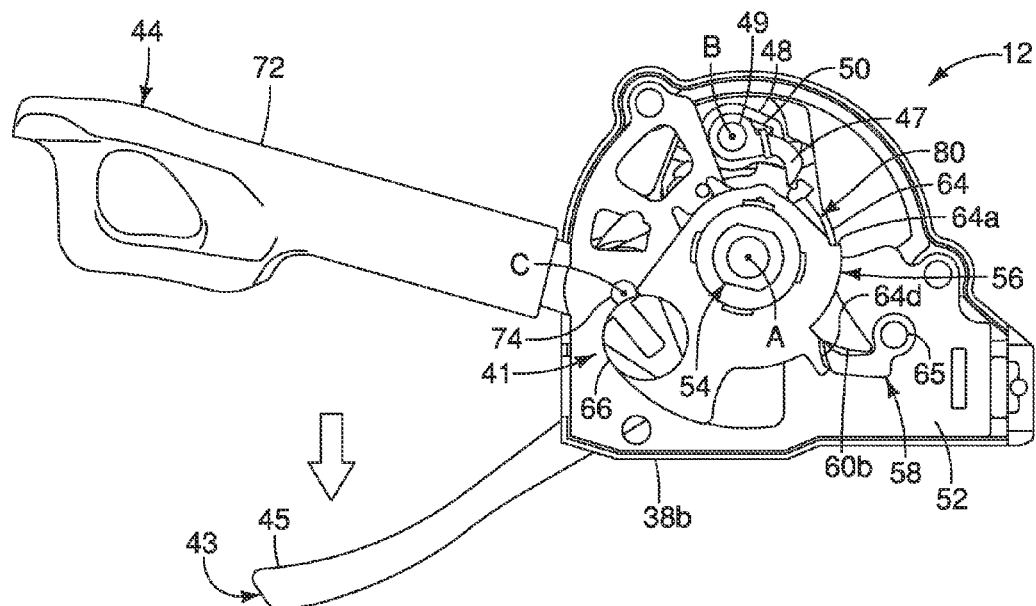
FIG. 28 is a top view, similar to FIGS. 22, 24 and 26, of selected internal parts of the first actuating unit of the bicycle control device illustrated in FIGS. 3 and 4, but with the first wire take-up member in a take-up position and the remaining parts returned to their rest positions.
Figure 29:
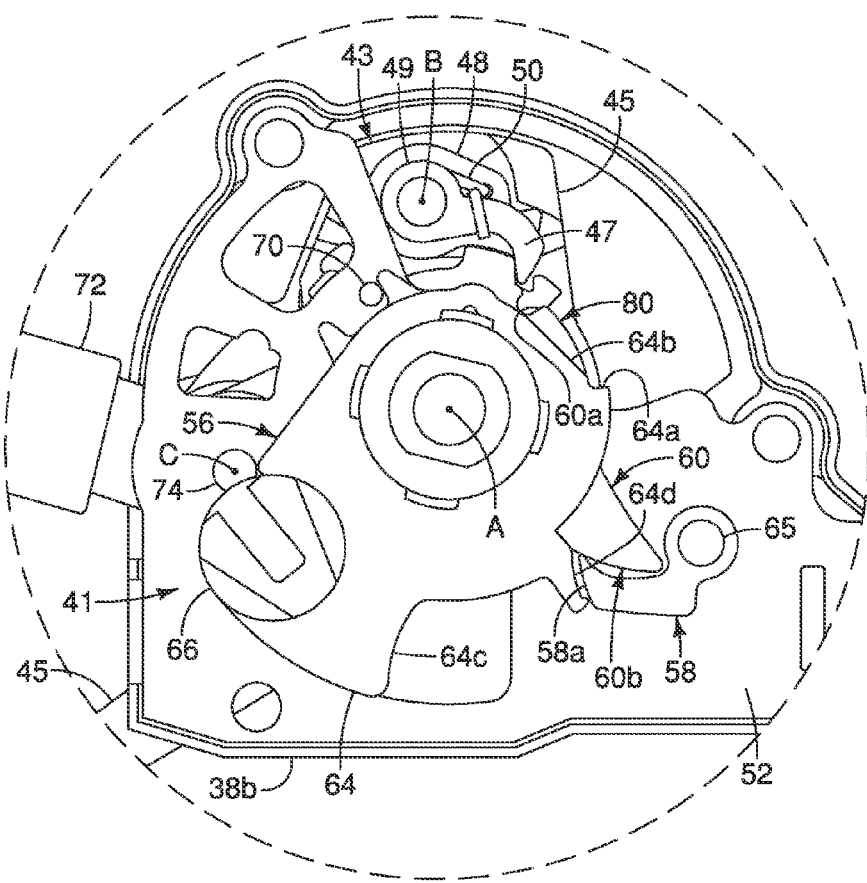
FIG. 29 is an enlarged top view of a selected portion of the bicycle control device illustrated in FIG. 28.

More specifically, upon operation of the first lever member 45, the first pulling member 47 moves with respect to the mounting member 36 to selectively move the first wire take-up member 56. Thus, the first wire take-up member 56 is movably arranged to move between at least the rest position (FIG. 12) and a take-up position (FIG. 28). In other words, the first pulling member 47 is configured to move the first wire take-up member 56 from the rest position to the take-up position in response to operation of the first pulling member 47. The first wire take-up member 56 is biased from the take-up position (FIG. 28) toward the rest position (FIG. 12) by the first biasing element 61. Thus, the first wire take-up member 56 moves with respect to the mounting member 36 in the take-up direction R1 for pulling the first control cable 31 and the releasing direction R2 for releasing the first control cable 31 in response to movement of the first lever member 45. Furthermore, the first pulling member 47 is engageably arranged with the first wire take-up member 56 while the first wire take-up member 56 is in an intermediate position between the rest position and the take-up position after the first wire take-up member 56 is released from the take-up position by the release member 60.

Now, as seen in FIGS. 7 and 8 the first wire take-up member 56 will be discussed in greater detail. The first wire take-up member 56 includes a control part 64, a cable attachment part 66 and a mounting part 68. While the control part 64, the cable attachment part 66 and the mounting part 68 are illustrated as separate elements that can be separated and coupled together, it will be apparent from this disclosure that these parts 64, 66 and 68 can be formed a one-piece member, if needed and/or desired. In the illustrated embodiment, the cable attachment part 66 is pivotally mounted in an opening of the control part 64. The cable attachment part 66 is located adjacent the outer periphery of the control part 64. The cable attachment part 66 is a conventional part that is configured to receive a nipple 31c that is fixed to the inner wire 31a. The mounting part 68 non-pivotally mates with the control part 64, and defines a center opening 68a that receives the first axle 54. In this way, the control part 64, the cable attachment part 66 and the mounting part 68 pivot together as a unit on the first axle 54 about the pulling axis A.

The control part 64 of the first wire take-up member 56 includes a first engagement surface 64a that is provided for pivoting the first wire take-up member 56 in the take-up direction R1 about the pulling axis A. Specifically, the first engagement surface 64a is configured to be selectively engaged by the first pulling member 47 for pivoting the first wire take-up member 56 in the take-up direction R1 about the pulling axis A. More specifically, the tooth 47a of the first pulling member 47 contacts the first engagement surface 64a of the first wire take-up member 56 during a wire pulling operation. In the illustrated embodiment, the control part 64 is a rigid control plate made of a suitable material such as a metallic material. The first engagement surface 64a is an abutment that is formed by the outer peripheral edge of the control part 64.

The control part 64 of the first wire take-up member 56 further includes a cam surface 64b that is configured to maintain the first pulling member 47 in a disengaged position from the release member 60 while the first wire take-up member 56 is in the rest position. The cam surface 64b is defined by a portion of the outer peripheral edge of the control part 64. The cam surface 64b is disposed upstream side of the take-up direction R1 with respect to the first engagement surface 64a. Moreover, the cam surface 64b is configured to disengage the first pulling member 47 from the release member 60 as the first wire take-up member 56 pivots from the take-up position to the rest position. In this way, the cam surface 64b of the control part 64 of the first wire take-up member 56 permits the position maintaining member 58 to move back to the holding position prior to the first wire take-up member 56 reaching the non-operated (rest) position.

The control part 64 of the first wire take-up member 56 further includes a first positioning abutment 64c and a second positioning abutment 64d. The first positioning abutment 64c is configured to engage the position maintaining member 58 for establishing the rest position of the first wire take-up member 56. The second positioning abutment 64d is configured to engage the position maintaining member 58 for establishing the take-up position of the first wire take-up member 56. The first and second positioning abutments 64c and 64d are defined by two spaced apart portions of the outer peripheral edge of the control part 64. In other words, first and second positioning abutments 64c and 64d protrude from the outer peripheral edge of the control part 64.

Now, the position maintaining member 58 will be discussed in greater detail. The position maintaining member 58 is a pawl that is pivotally mounted between the first and second stationary support plates 51 and 52 by a pivot pin 65. The position maintaining member 58 has an abutment or tooth 58a that selectively contacts the positioning abutments 64c and 64d of the first wire take-up member 56. In this way, the position maintaining member 58 moves with respect to the mounting member 36 to move between a holding position that holds the first wire take-up member 56 in one of a plurality of predetermined positions and a releasing position that releases the first wire take-up member 56 for pivotal movement. With the first wire take-up member 56 in the rest position, the position maintaining member 58 abuts against the first positioning abutment 64c. With the first wire take-up member 56 in the take-up position, the position maintaining member 58 abuts against the second positioning abutment 64d. The release member 60 moves the position maintaining member 58 from the holding position to the releasing position as the first lever member 45 is operated from the non-operated position to the operated position. In other words, as the first lever member 45 is operated from the non-operated position to the operated position, the release member 60 pivots the position maintaining member 58 from the holding position to the releasing position to disengage the position maintaining member 58 from second positioning abutment 64d.

While the position maintaining member 58 of the first actuating unit 41 only holds the first wire take-up member 56 in two predetermined positions, it will be apparent from this disclosure that the first actuating unit 41 could be configured such that the position maintaining member 58 holds the first wire take-up member 56 in only one predetermined position or more than two predetermined positions as needed and/or desired. However, in the case of certain bicycle components, the first wire take-up member 56 and the position maintaining member 58 are configured to establish only two of the predetermined positions as is the case in the illustrated embodiment. In other words, in the illustrated embodiment, the first wire take-up member 56 and the position maintaining member 58 are configured to operate a derailleur (e.g., the front derailleur FD) as the bicycle component with only two operating positions. Alternatively, the first wire take-up member 56 and the position maintaining member 58 are configured to operate a suspension (e.g., the rear suspension RS) as the bicycle component with only two operating states.

The second biasing element 62 is a torsion spring having a coiled portion coiled around the pivot pin 65. A first end of the second biasing element 62 is engaged with the first stationary support plate 51, while a second end of the second biasing element 62 is engaged with the position maintaining member 58. In this way, the second biasing element 62 biases the position maintaining member 58 about the pivot pin 65 towards engagement with the first wire take-up member 56.

Now, the release member 60 will be discussed in greater detail. In the illustrated embodiment, the release member 60 is a rigid release plate made of a suitable material such as a metallic material. The release member 60 is pivotally mounted on the first axle 54. The second biasing element 62 biases the release member 60 via the position maintaining member 58 in the releasing direction R2. In particular, the second biasing element 62 biases the position maintaining member 58 about the pivot pin 65 against the release member 60. More specifically, the tip of the position maintaining member 58 contacts the release member 60 and effectively applies a biasing on the release member 60 to pivot the release member 60 about the pulling axis A in a direction that corresponds to the releasing direction R2 of the first wire take-up member 56. The second stationary support plate 52 is provided with a stop pin 70 that establishes end movement positions of the release member 60.

Figure 22:
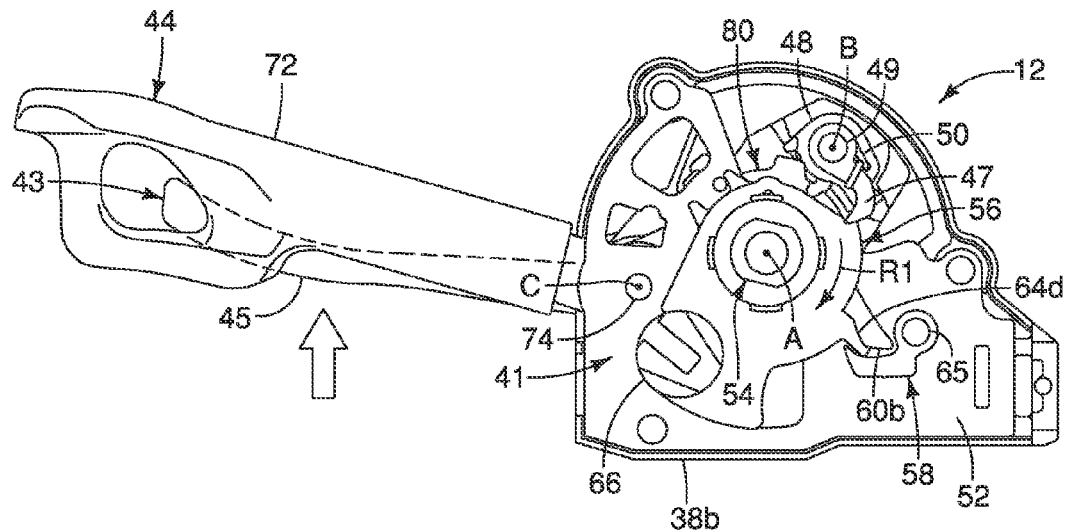
FIG. 22 is a top view of selected internal parts of the first actuating unit of the bicycle control device illustrated in FIGS. 3 and 4, with the operating lever having been moved from the rest position to pivot the first wire take-up member without moving the release member and to start pivoting the position maintaining member (e.g., a holding pawl) without moving the release member.
Figure 23:
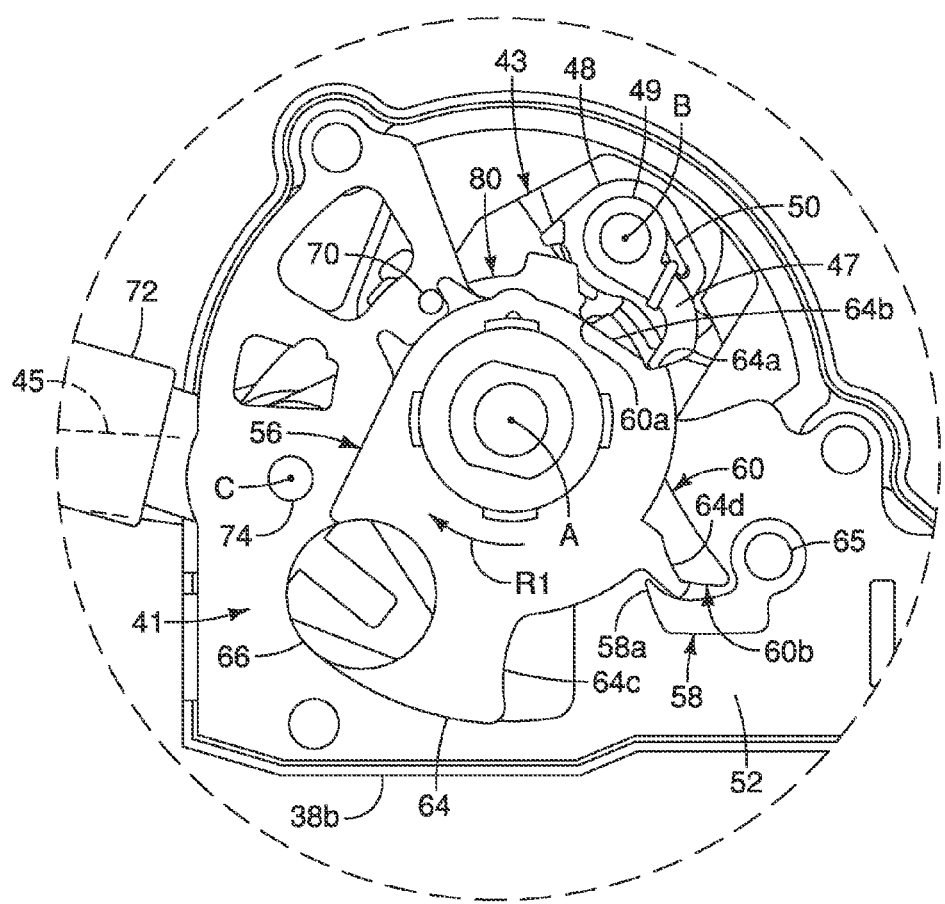
FIG. 23 is an enlarged top view of a selected portion of the bicycle control device illustrated in FIG. 22.
Figure 24:
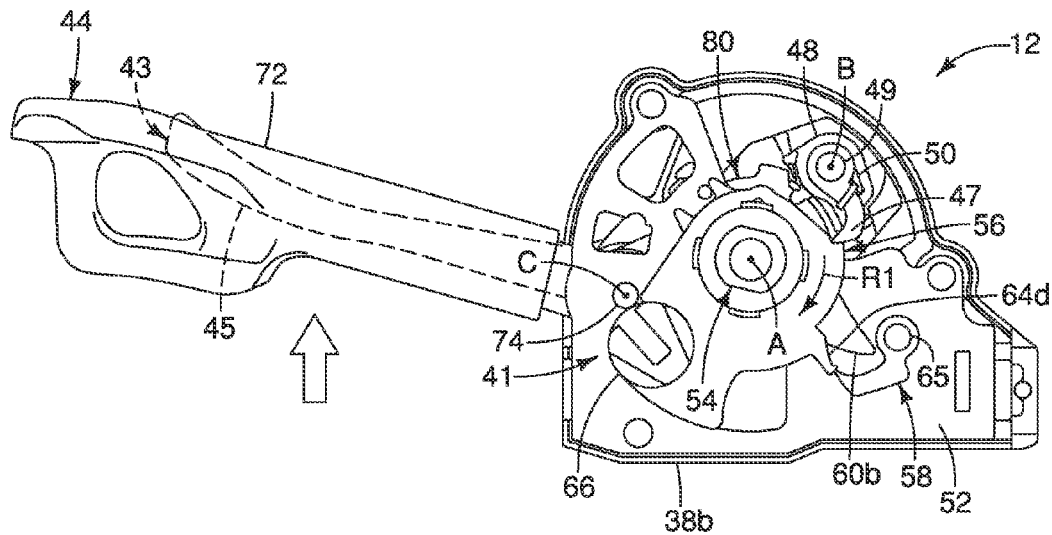
FIG. 24 is a top view, similar to FIG. 22, of selected internal parts of the first actuating unit of the bicycle control device illustrated in FIGS. 3 and 4, but with the operating lever having been moved further from the rest position than in FIG. 22 to further pivot the first wire take-up member and to further pivot the position maintaining member to a releasing position without moving the release member.
Figure 25:
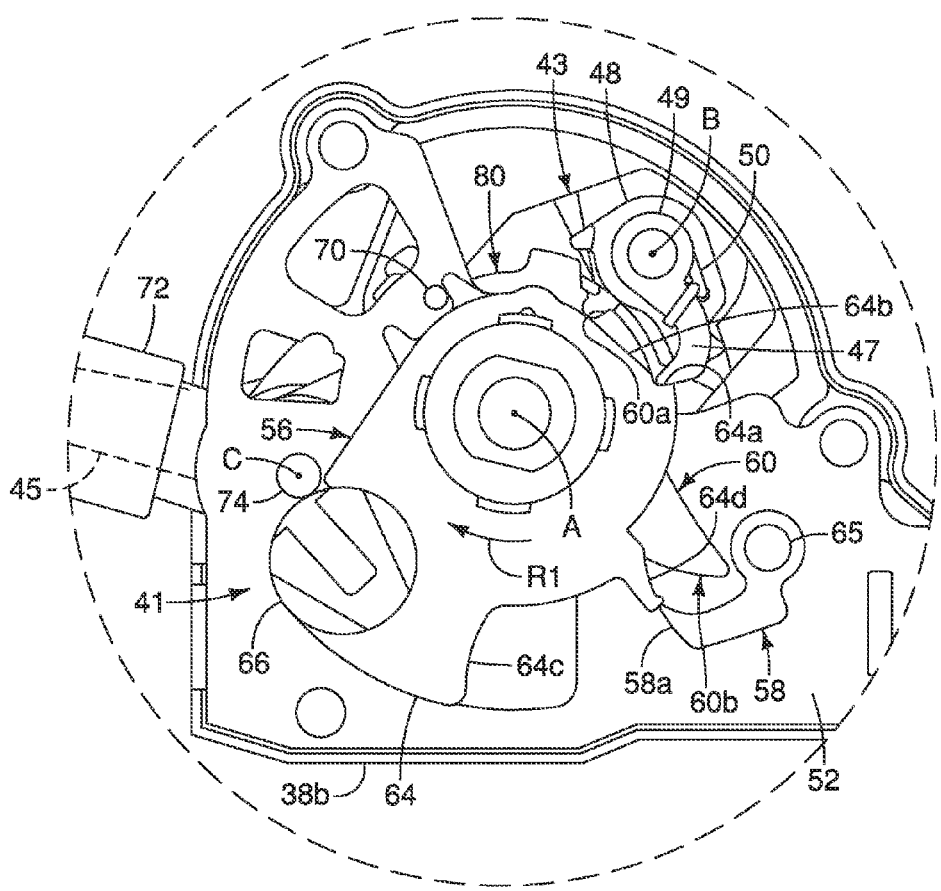
FIG. 25 is an enlarged top view of a selected portion of the bicycle control device illustrated in FIG. 24.
Figure 26:
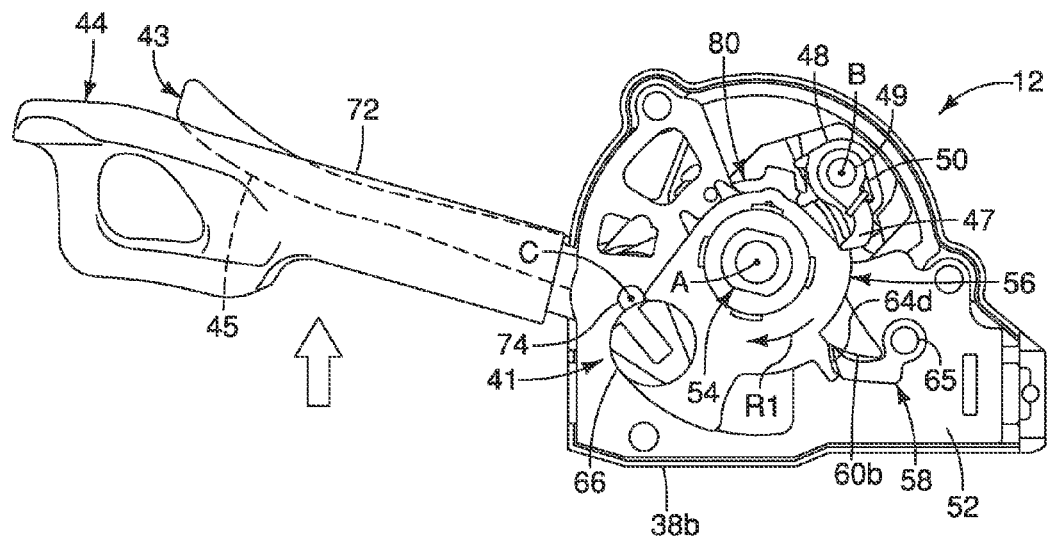
FIG. 26 is a top view, similar to FIGS. 22 and 24, of selected internal parts of the first actuating unit of the bicycle control device illustrated in FIGS. 3 and 4, but with the operating lever having been moved further from the rest position than in FIG. 24 to further pivot the first wire take-up member and to allow the position maintaining member to pivot back to a holding position without moving the release member.
Figure 27:
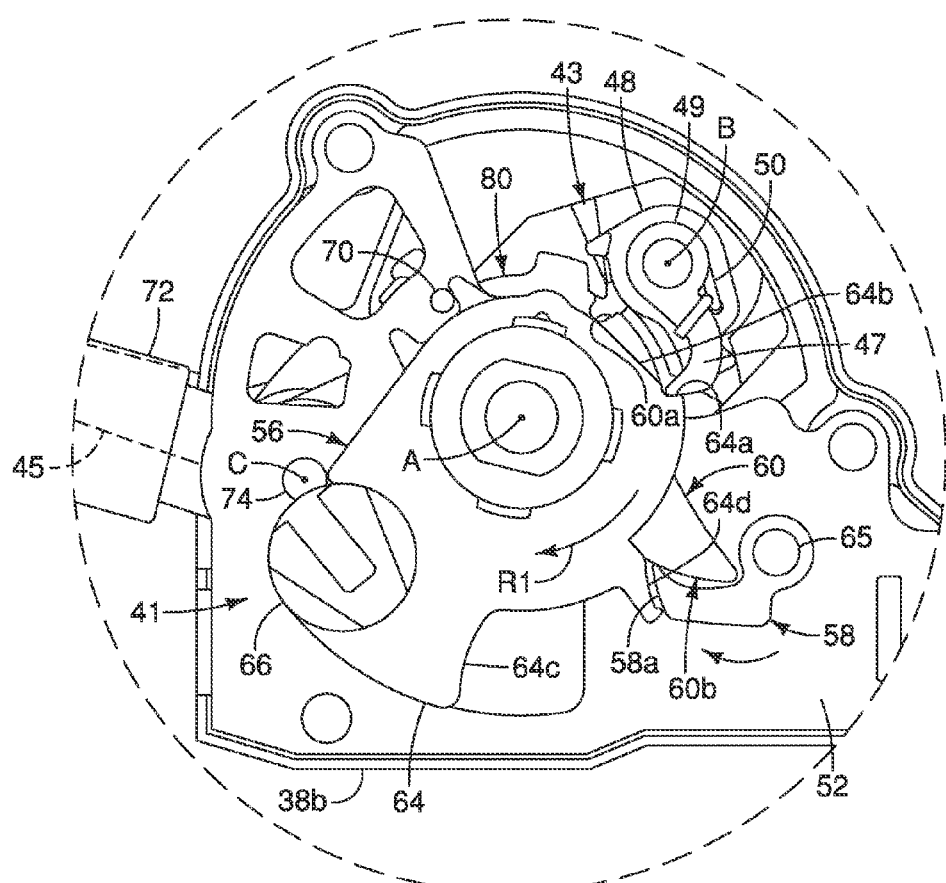
FIG. 27 is an enlarged top view of a selected portion of the bicycle control device illustrated in FIG. 26.

The first pulling member 47 moves with respect to the mounting member 36 to selectively move the first wire take-up member 56 and the release member 60. In particular, the first wire take-up member 56 and the release member 60 are selectively moved in the same direction with respect to the mounting member 36 as the first lever member 45 is moved with respect to the mounting member 36 from the non-operated position to the operated position. Specifically, with the first wire take-up member 56 in the take-up position (FIG. 22), the release member 60 pivots with respect to the mounting member 36 to move the position maintaining member 58 between the holding position and the releasing position as the first lever member 45 moves between the rest position and the operated position. More specifically, the first pulling member 47 is configured to move the release member 60 such that the release member 60 moves the position maintaining member 58 from the holding position to the releasing position as the first lever member 45 is operated from the rest position to the operated position while the position maintaining member 58 is holding the first wire take-up member 56 in the take-up position (FIG. 22). As the release member 60 is moved by the first pulling member 47, the first wire take-up member 56 moves in the releasing direction by a biasing force of the first biasing element 61, because the first wire take-up member 56 is released from the position maintaining member 58 by the position maintaining member 58 being moved to the releasing position. On the other hand, with the first wire take-up member 56 in the rest position (FIG. 12), the first pulling member 47 does not pivot the release member 60, but rather pivots the first wire take-up member 56 in the take-up direction R1. In other words, the first pulling member 47 is disengaged from the release member 60 while the first wire take-up member 56 is in the rest position. Also, as the first wire take-up member 56 is moved by the first pulling member 47, the first wire take-up member 56 is moved by the first pulling member 47 in the take-up direction, the release member 60 remains stationary.

The release member 60 includes a second engagement surface 60a that is configured to be selectively engaged by the first pulling member 47. In particular, the tooth 47a of the first pulling member 47 contacts the second engagement surface 60a of the release member 60 during a wire releasing operation to move the release member 60 in the take-up direction R1. The second engagement surface 60a is defined by a portion of the outer peripheral edge of the release member 60. The second engagement surface 60a is an abutment that is formed by the outer peripheral edge of the release member 60. The second engagement surface 60a protrudes from the outer peripheral edge of the release member 60. The second engagement surface 60a is offset from the first engagement surface 64a in the take-up direction R1 of the first wire take-up member 56 while the first wire take-up member 56 is in the rest position. The first engagement surface 64a of the first wire take-up member 56 is radially and outwardly offset from the second engagement surface 60a of the release member 60 with respect to the pulling axis A. Also the second engagement surface 60a of the release member 60 is radially and inwardly offset from a radially outermost point of the cam surface 64b of the first wire take-up member 56 with respect to the pulling axis A. In other words, the second engagement surface 60a of the release member 60 is located radially inward from the radially outermost point of the cam surface 64b of the first wire take-up member 56 with respect to the pulling axis A. In this way, the cam surface 64b of the first wire take-up member 56 can prevent the first pulling member 47 from engaging the second engagement surface 60a of the release member 60 as the first lever member 45 is operated from the non-operated position to the operated position when the first wire take-up member 56 is in the rest position. In other words, the first pulling member 47 is configured to engage with the second engagement surface 60a when the first wire take-up member 56 is in the take-up position.

The release member 60 also includes a cam surface 60b that is configured to selectively pivot the position maintaining member 58 about its pivot axis to a releasing position. In this way, the release member 60 releases the first wire take-up member 56 so that it returns to the rest position by the biasing force of the first biasing element 61.

Referring now to FIGS. 9 and 47 to 57, the second actuating unit 42 of the bicycle control device 12 will now be discussed in greater detail. Basically, the second actuating unit 42 is operated by moving the changing member 44 from the first (non-operated) position to the second (operated) position, and then subsequently operating the first lever member 45 with the changing member 44 held in the second (operated) position. Thus, as a result of the operation of the changing member 44, the first pulling member 47 is disengaged from the first actuating unit 41 so that operation of the first lever member 45 operates the second actuating unit 42.

Now, the changing member 44 will be discussed in greater detail. The changing member 44 comprises a second lever member 72 that is pivotally mounted about an axis C that is offset from and parallel to the pulling axis A. In the illustrated embodiment, a second axle 74 is mounted between the second and third stationary support plates 52 and 53 to pivotally support the second axle 74. Preferably, two additional stationary support plates 76 and 78 are provided to support the second axle 74. The additional stationary support plates 76 and 78 are mounted to the first axle 54 and the second axle 74. The first and second lever members 45 and 72 extend toward an end of a handlebar 24 along longitudinal direction of the handlebar 24. Preferably, the second lever member 72 is longer than the first lever member 45 in a state in which the mounting member 36 is mounted to the handlebar 24. In particular, with the illustrated configuration, the first lever member 45 will be typically operated by the rider's thumb, while the second lever member 72 will be typically operated by the rider's index finger. Thus, this arrangement provides for easy operation of the first and second lever members 45 and 72

The changing member 44 further comprises a cam member 80 that engages and moves the first and second pulling members 47 and 48 upon operation of the second lever member 72 of the changing member 44. The cam member 80 of the changing member 44 is pivotally mounted on the first axle 54 to pivot about the pulling axis A. Preferably, as the cam member 80 begins to pivot about the pulling axis A, the cam member 80 will first start pivoting the first pulling member 47, before the cam member 80 pivoting the second pulling member 48, and then will start pivoting the second pulling member 48 as the first pulling member 47 continues to be pivoted. Thus, the first and second pulling members 47 and 48 are initially sequentially pivoted and then subsequently pivoted together by the movement of the second lever member 72.

A return spring 82 or other biasing element is operatively coupled between the second lever member 72 and the additional stationary support plate 78 for biasing the second lever member 72 towards the first position, which is a rest position. Here in the illustrated embodiment, the return spring 82 is a torsion spring that has a coiled portion coiled about the first axle 54. A first end of the return spring 82 is disposed hooked on the second lever member 72, while a second end of the return spring 82 is hooked on the additional stationary support plate 78.

A return spring 84 or other biasing element is operatively coupled between the cam member 80 and the second stationary support plate 52 for biasing the cam member 80 towards the first position, which is a rest position. Thus, the changing member 44 is biased towards the first position which corresponds to the rest position of the changing member 44 by the return springs 82 and 84.

In the illustrated embodiment, the second actuating unit 42 comprises a second wire take-up member 86. The second wire take-up member 86 is pivotally mounted on the first axle 54 about the pulling axis A. Thus, the cam member 80 of the changing member 44 and the first and second wire take-up members 56 and 86 are pivotally mounted with respect to the mounting member 36 about the single pulling axis A. As mentioned above, the spring 50 biases the first and second pulling members 47 and 48 in opposite directions about the pivot axis B. Thus, the first pulling member 47 is biased towards the first wire take-up member 56, and the second pulling member 48 is biased away from the second wire take-up member 86.

In the illustrated embodiment, the second pulling member 48 is arranged to engage the second wire take-up member 86 for pulling the second control cable 32. In particular, as the first lever member 45 is pivoted from the rest position (FIG. 12) to the take-up position (FIG. 22) while the changing member 44 is held in the second (operated) position, the second pulling member 48 is pivoted by the cam member 80, which moves the second pulling member 48 into engagement with the second wire take-up member 86 to pull the second control cable 32. Upon releasing the first lever member 45 from the operated position, the first lever member 45, the cam member 80 and the second wire take-up member 86 all automatically returns their rest positions to release the second control cable 32.

In the illustrated embodiment, the second wire take-up member 86 includes a control part 88, a cable attachment part 90 and a mounting part 92. While the control part 88, the cable attachment part 90 and the mounting part 92 are illustrated as separate elements that can be separated and coupled together, it will be apparent from this disclosure that these parts 88, 90 and 92 can be formed a one-piece member, if needed and/or desired. In the illustrated embodiment, the cable attachment part 90 is pivotally mounted in an opening of the control part 88. The cable attachment part 90 is located adjacent the outer periphery of the control part 88. The cable attachment part 90 is a conventional part that is configured to receive a nipple 32c that is fixed to the inner wire 32a. The mounting part 92 is a bushing that pivotally mates with a central opening of the control part 88, and defines a center opening 92a that receives the first axle 54. In this way, at least the control part 88 and the cable attachment part 90 pivot together as a unit on the first axle 54 about the pulling axis A.

The control part 88 of the second wire take-up member 86 includes an engagement surface 88a that is arranged to be engaged by the tooth 48a of the second pulling member 48 for pivoting the second wire take-up member 86 in the take-up direction R1 about the pulling axis A. Specifically, the tooth 48a of the second pulling member 48 contacts the engagement surface 88a of the second wire take-up member 86 during a wire pulling operation of the second actuating unit 42. In the illustrated embodiment, the control part 88 is a rigid control plate made of a suitable material such as a metallic material. The engagement surface 88a is an abutment that is formed by the outer peripheral edge of the control part 88. The engagement surface 88a protrudes from the outer peripheral edge of the control part 88. Preferably, the engagement surface 88a is hook-shaped so that upon the tooth 48a of the second pulling member 48 mating with the engagement surface 88a.

In the illustrated embodiment, the cam member 80 is a rigid cam plate made of a suitable material such as a metallic material. The cam member 80 has a first cam surface 80a that engages and moves the first pulling member 47 to disengage the first pulling member 47 from the first wire take-up member 56 upon operation of the second lever member 72 to pivot the cam member 80. The cam member 80 has a second cam surface 80b that engages and moves the second pulling member 48 to engage the second pulling member 48 with the second wire take-up member 86 upon operation of the second lever member 72 to pivot the cam member 80. Preferably, the first and second cam surfaces 80a and 80b are formed by the outer peripheral edge of the cam member 80. The first and second cam surfaces 80a and 80b are spaced apart along the outer peripheral edge of the cam member 80. Preferably, as the cam member 80 begins to pivot about the pulling axis A, the first cam surface 80a will start pivoting the first pulling member 47 before the second cam surface 80b contacts the second pulling member 48. Thus, the first and second pulling members 47 and 48 are initially sequentially pivoted and then pivoted together.

Preferably, the cam member 80 further has a first holding surface 80c and a second holding surface 80d. The first and second holding surfaces 80c and 80d are formed by the outer peripheral edge of the cam member 80. The first holding surface 80c is contiguous with the first cam surface 80a. The first holding surface 80c holds the first pulling member 47 in a disengaged position with respect to the first wire take-up member 56 while the second lever member 72 is in a fully operated position. The second holding surface 80d is contiguous with the second cam surface 80b. The second holding surface 80d holds the second pulling member 48 in an engaged position with respect to the second wire take-up member 86 while the second lever member 72 is in a fully operated position.

During a switching operation for selecting the second actuating unit 42 to be operated, the cam member 80 will be pivoted by the pivoting of the second lever member 72. In particular, the second lever member 72 has a projection 72a that engages an abutment 80e of the earn member 80 such that the cam member 80 pivots about the first axle 54, while the second lever member 72 pivots about the second axle 74. This pivoting of the cam member 80 causes the first cam surface 80a to engage the tooth 47a of the first pulling member 47 so as to pivot the first pulling member 47 on the pivot axle 49 about the pivot axis B. After a small amount of pivotal moment of the cam member 80, the second cam surface 80b contacts the projection 48b of the second pulling member 48 so as to pivot the second pulling member 48 on the pivot axle 49 about the pivot axis B. Thus, the first and second pulling members 47 and 48 pivot in opposite directions about the pivot axis B in response to the pivoting of the cam member 80 by the second lever member 72. In this way, the cam member 80 of the changing member 44 changes a state of engagement between the first pulling member 47 and the first wire take-up member 56, and changes a state of engagement between the second pulling member 48 and the second wire take-up member 86.

After this initial pivoting of the cam member 80 by the second lever member 72, continued pivoting of the cam member 80 results in the tooth 47a of the first pulling member 47 sliding onto the first holding surface 80c, and the projection 48b of the second pulling member 48 sliding onto the second holding surface 80d. Once the cam member 80 is pivoted to the point that the tooth 47a of the first pulling member 47 and the projection 48b of the second pulling member 48 are resting on the first and second holding surfaces 80c and 80d, the tooth 48a of the second pulling member 48 is in position to engage the engagement surface 88a of the second wire take-up member 86. Thus, upon pivoting the first lever member 45 about the pulling axis A for a small amount of movement, the tooth 48a of the second pulling member 48 engages the engagement surface 88a of the second wire take-up member 86. Now, with the tooth 48a engaged with the engagement surface 88a, further pivoting of the first lever member 45 about the pulling axis A causes the second wire take-up member 86 to pivot in the take-up direction R1 about the pulling axis A. Also, once the tooth 48a engaged with the engagement surface 88a, the second lever member 72 can be released due to the hook-shape of the engagement surface 88a.

Figure 12:
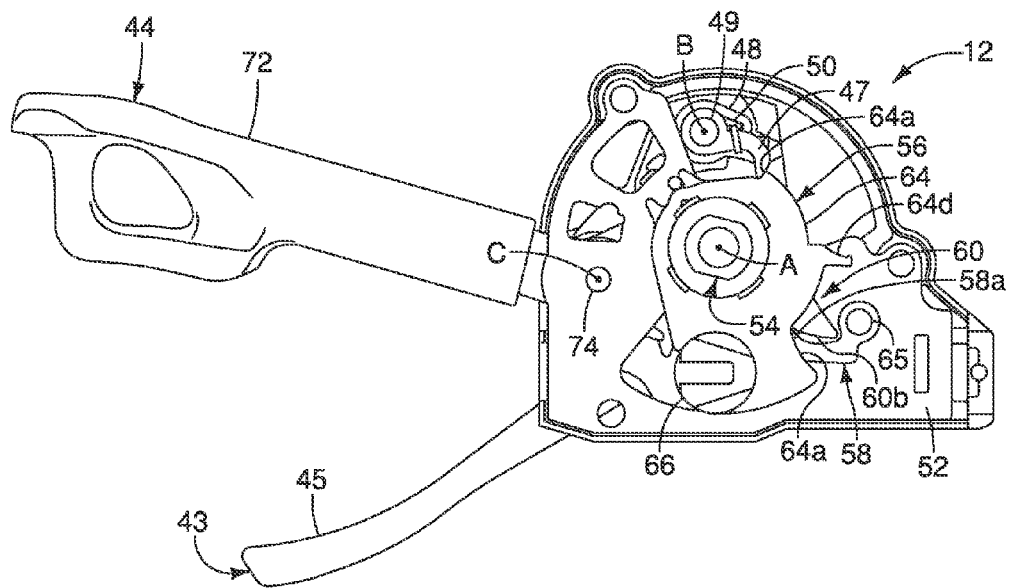
FIG. 12 is a top view of the bicycle control device illustrated in FIGS. 3 and 4, but with selected parts removed to illustrate selected parts of the internal parts of the bicycle control device in their rest positions.
Figure 13:
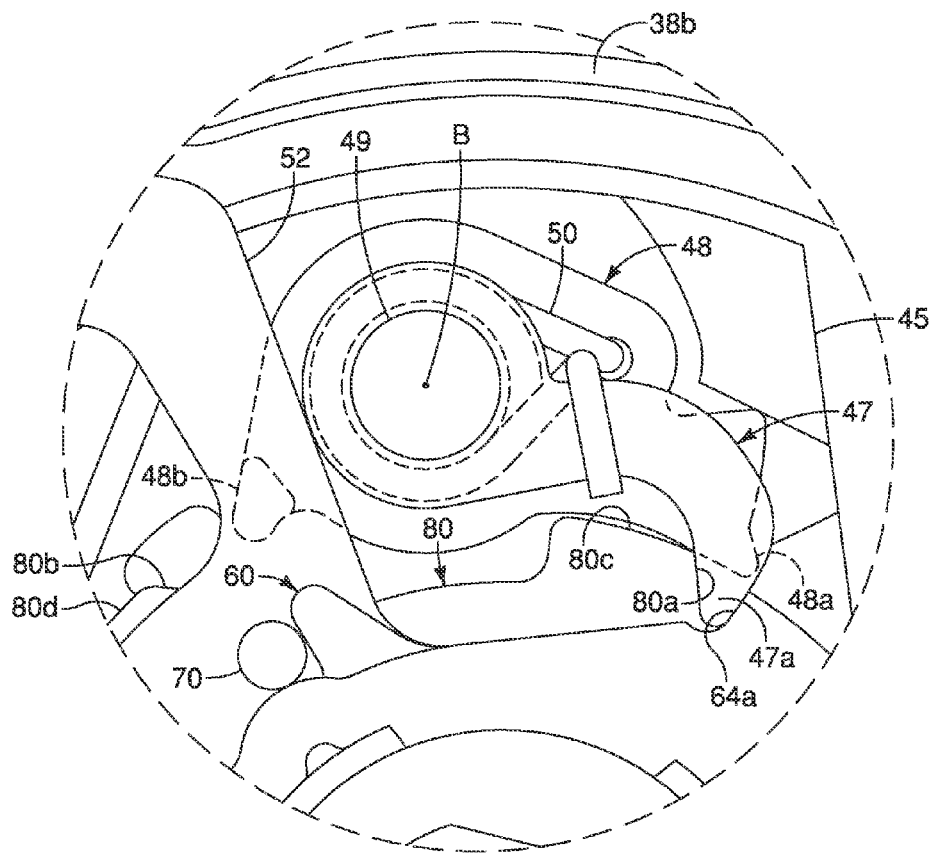
FIG. 13 is an enlarged top view of a selected portion of the bicycle control device illustrated in FIG. 12 to show the first and second pulling members in their rest positions.
Figure 14:
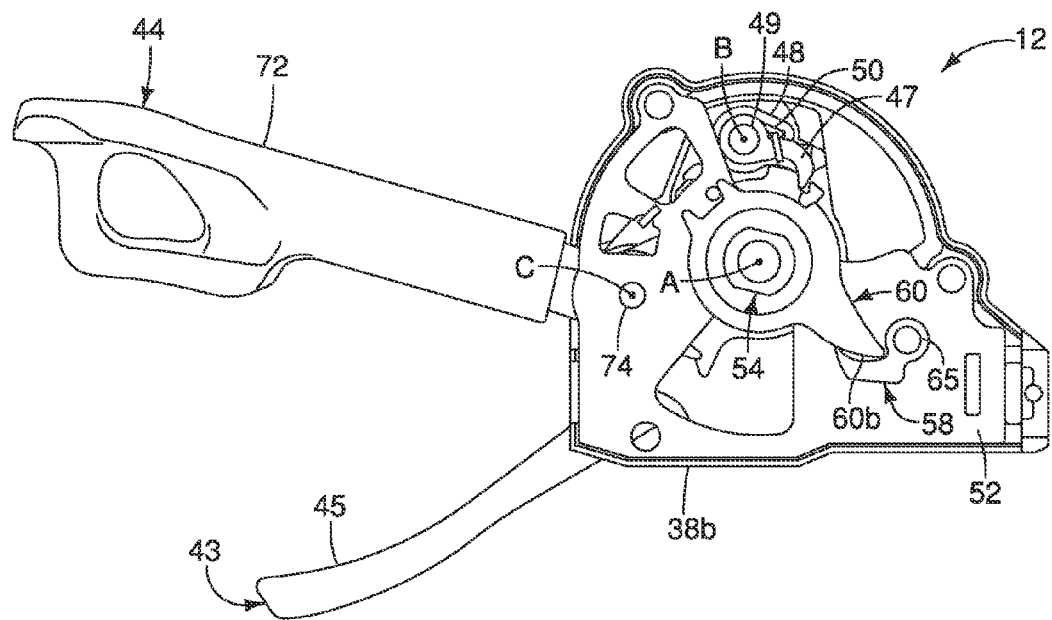
FIG. 14 is another top view, similar to FIG. 12, of the bicycle control device illustrated in FIGS. 3 and 4, but with selected parts removed to illustrate selected parts of the internal parts of the bicycle control device in their rest positions.
Figure 15:
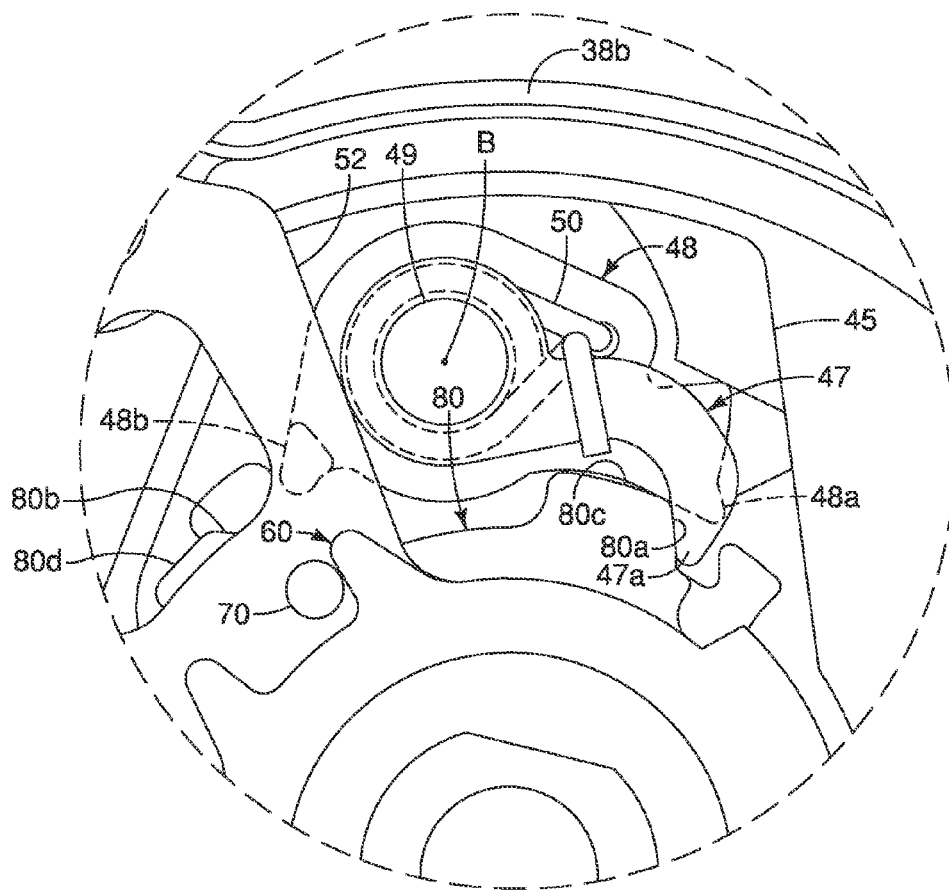
FIG. 15 is an enlarged top view of a selected portion of the bicycle control device illustrated in FIG. 14 to show the first and second pulling members in their rest positions.
Figure 16:
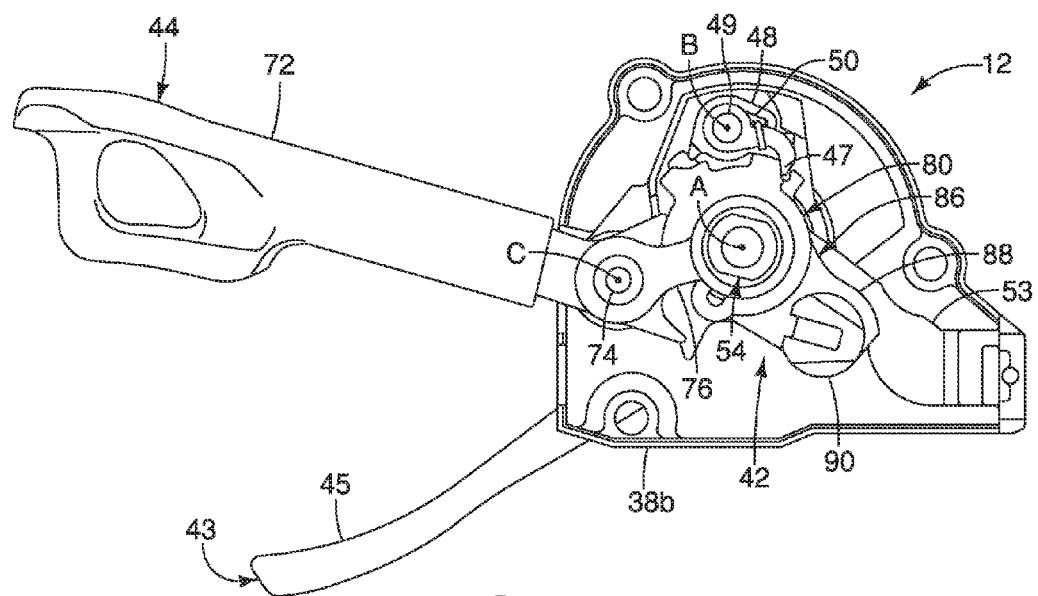
FIG. 16 is a top view, similar to FIGS. 12 and 14, of the bicycle control device, but with selected parts removed to illustrate selected parts of the internal parts of the bicycle control device in their rest positions.
Figure 17:
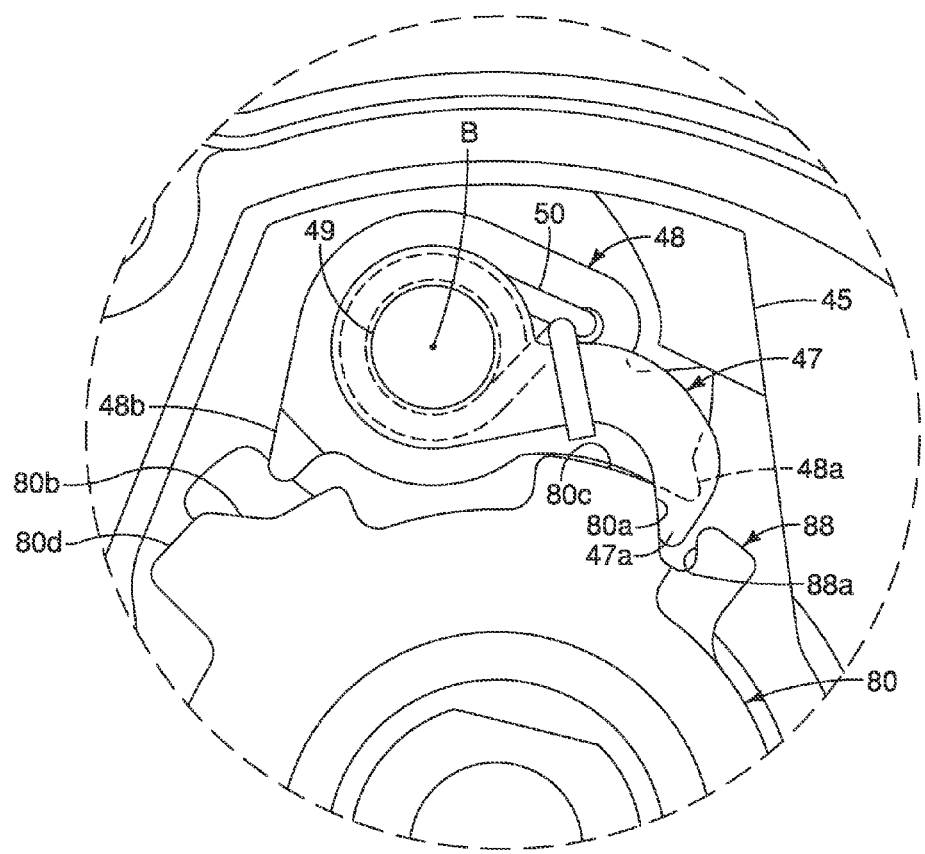
FIG. 17 is an enlarged top view of a selected portion of the bicycle control device illustrated in FIG. 16 to show the first and second pulling members in their rest positions.
Figure 18:
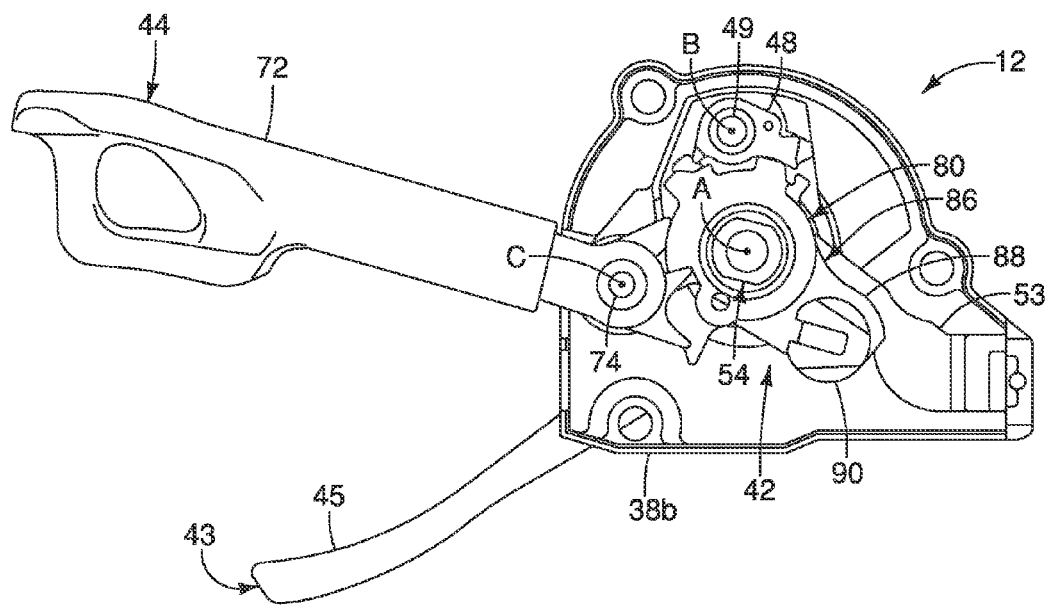
FIG. 18 is a top view, similar to FIGS. 12, 14 and 16, of selected internal parts of the first actuating unit of the bicycle control device illustrated in FIGS. 3 and 4, but with selected parts removed to illustrate selected parts of the internal parts of the bicycle control device in their rest positions.
Figure 19:
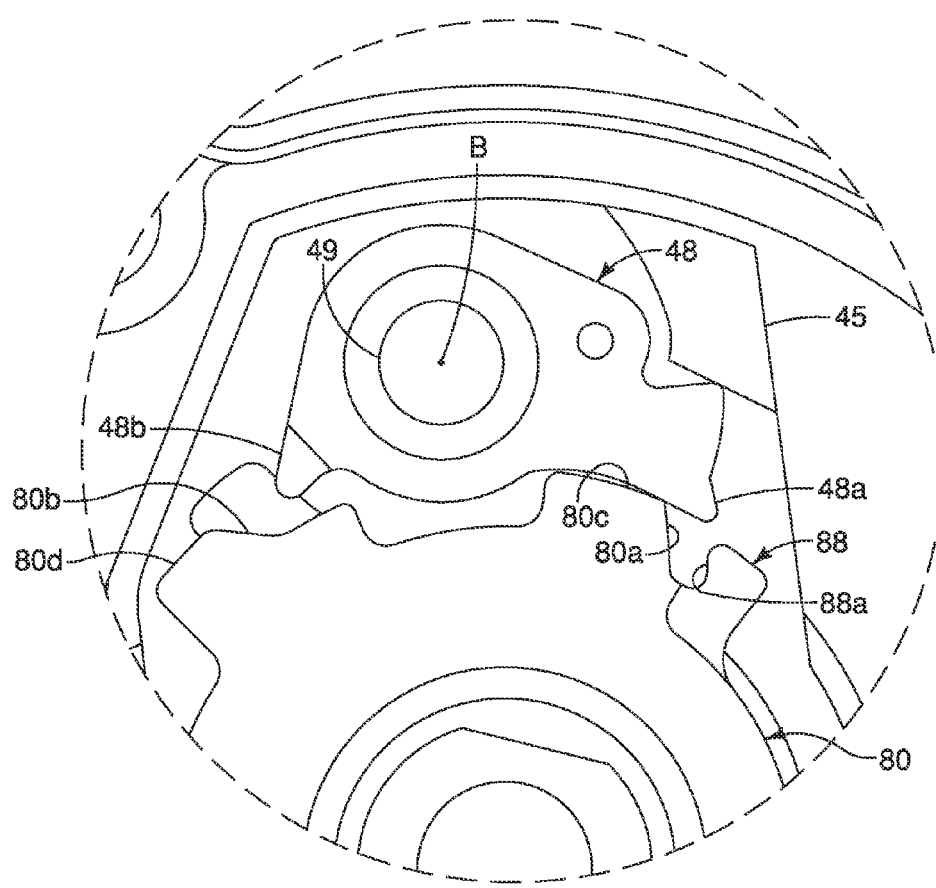
FIG. 19 is an enlarged top view of a selected portion of the bicycle control device illustrated in FIG. 18 to show the first and second pulling members in their rest positions.
Figure 20:
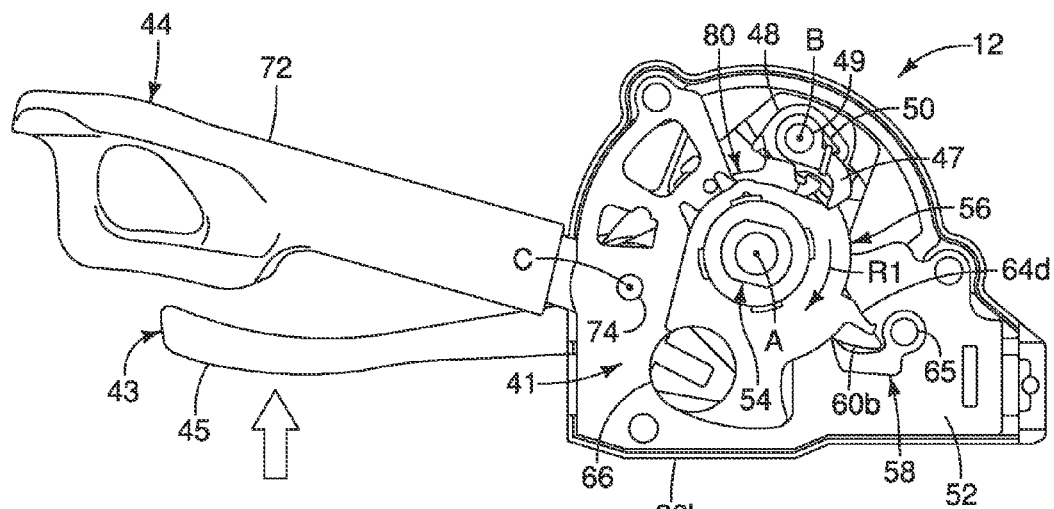
FIG. 20 is a top view, similar to FIGS. 12, 14, 16 and 18, of selected internal parts of the first actuating unit of the bicycle control device illustrated in FIGS. 3 and 4, but with selected parts removed to illustrate selected parts of the internal parts of the bicycle control device in their rest positions.
Figure 21:
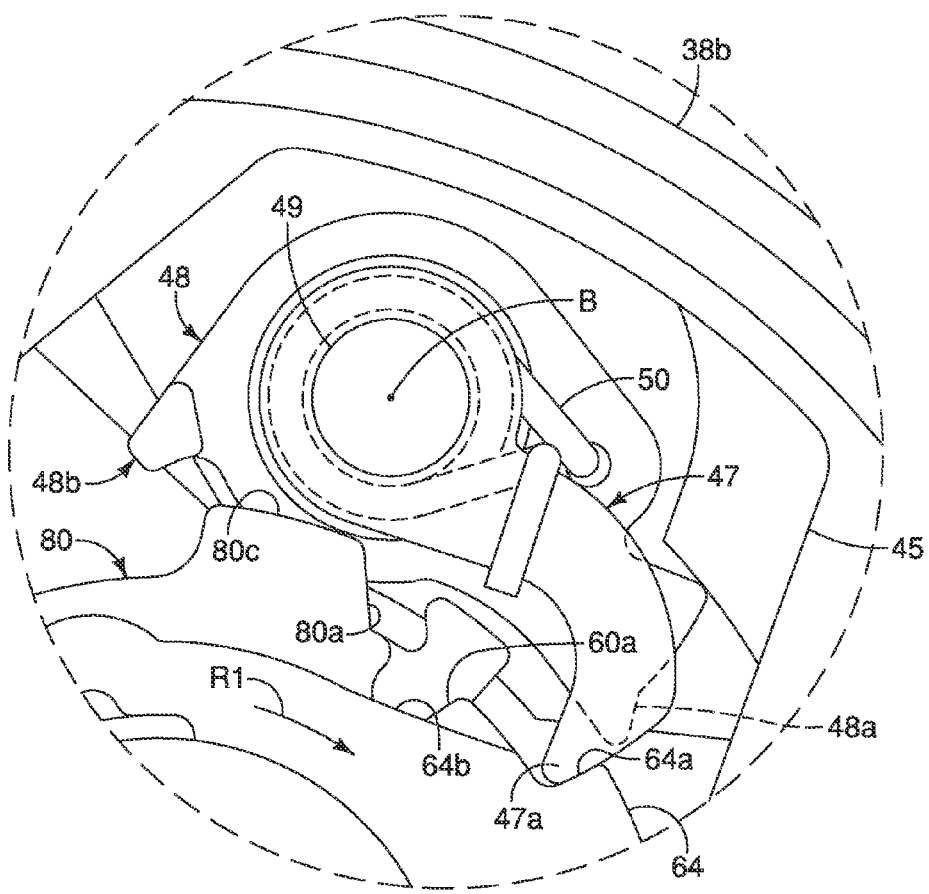
FIG. 21 is an enlarged top view of a selected portion of the bicycle control device illustrated in FIG. 20 to show the first and second pulling members in their rest positions.

Referring to FIGS. 12, 13 and 20 to 29, the bicycle control device 12 is illustrated in which the first actuating unit 41 performs a wire pulling operation of the first control cable 31 by operating the first lever member 45. FIGS. 12 and 13 show selected parts of the bicycle control device 12 in their rest positions. FIGS. 20 to 29 show the selected parts of the bicycle control device 12 be sequentially moved as the first lever member 45 is pivoted from the non-operated (rest) position to the operated position and then back to the non-operated (rest) position to perform the wire pulling operation of the first control cable 31.

Basically, during the wire pulling operation of the first control cable 31 by operating the first lever member 45, the tooth 47a of the first pulling member 47 engages the first engagement surface 64a of the first wire take-up member 56 to rotate the first wire take-up member 56. As the first wire take-up member 56 rotates, the position maintaining member 58 is pivoted about its pivot axis to a releasing position and then pivots back to the holding position to engage the second positioning abutment 64d. Thus, the position maintaining member 58 holds the first wire take-up member 56 in the take-up position. Meanwhile, upon releasing the first lever member 45, the first lever member 45 returns to the non-operated position.

Figure 30:
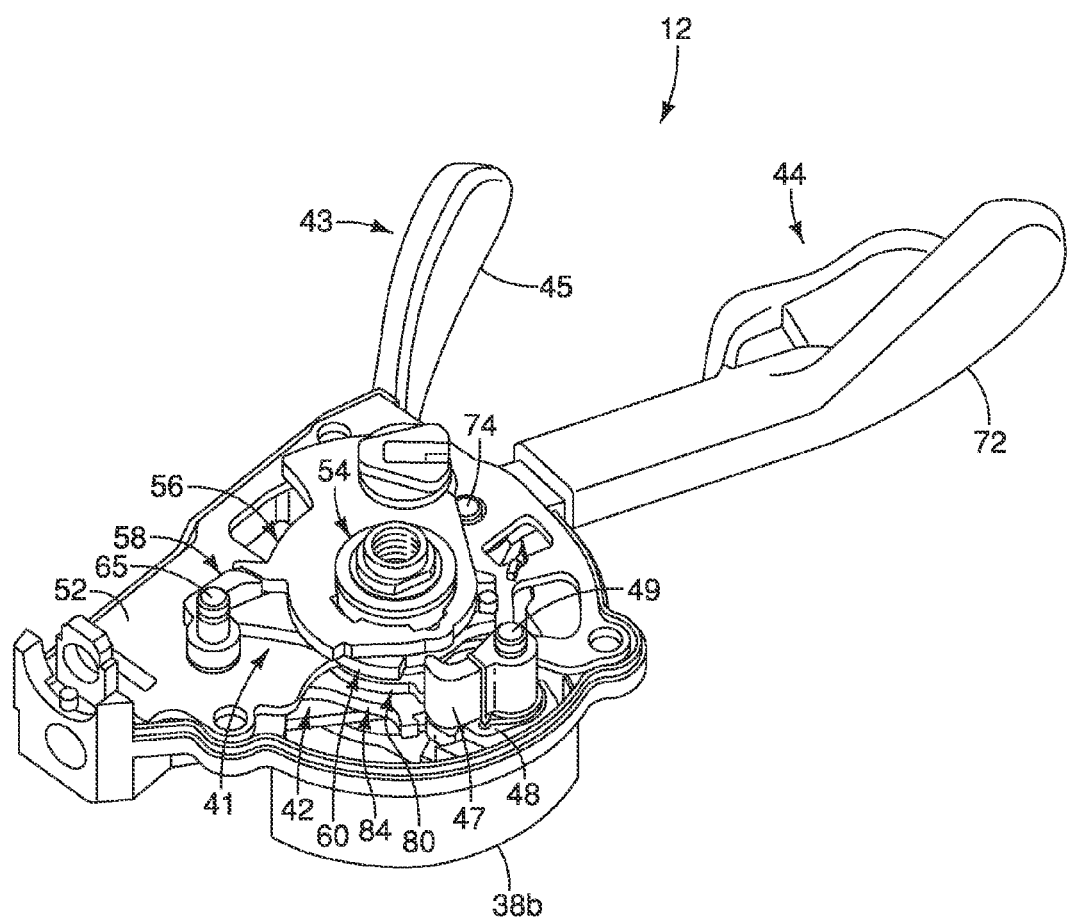
FIG. 30 is a top perspective view of the selected internal parts of the bicycle control device illustrated in FIGS. 3 and 4, but with the first wire take-up member in a take-up position and the remaining parts in their rest positions.
Figure 31:
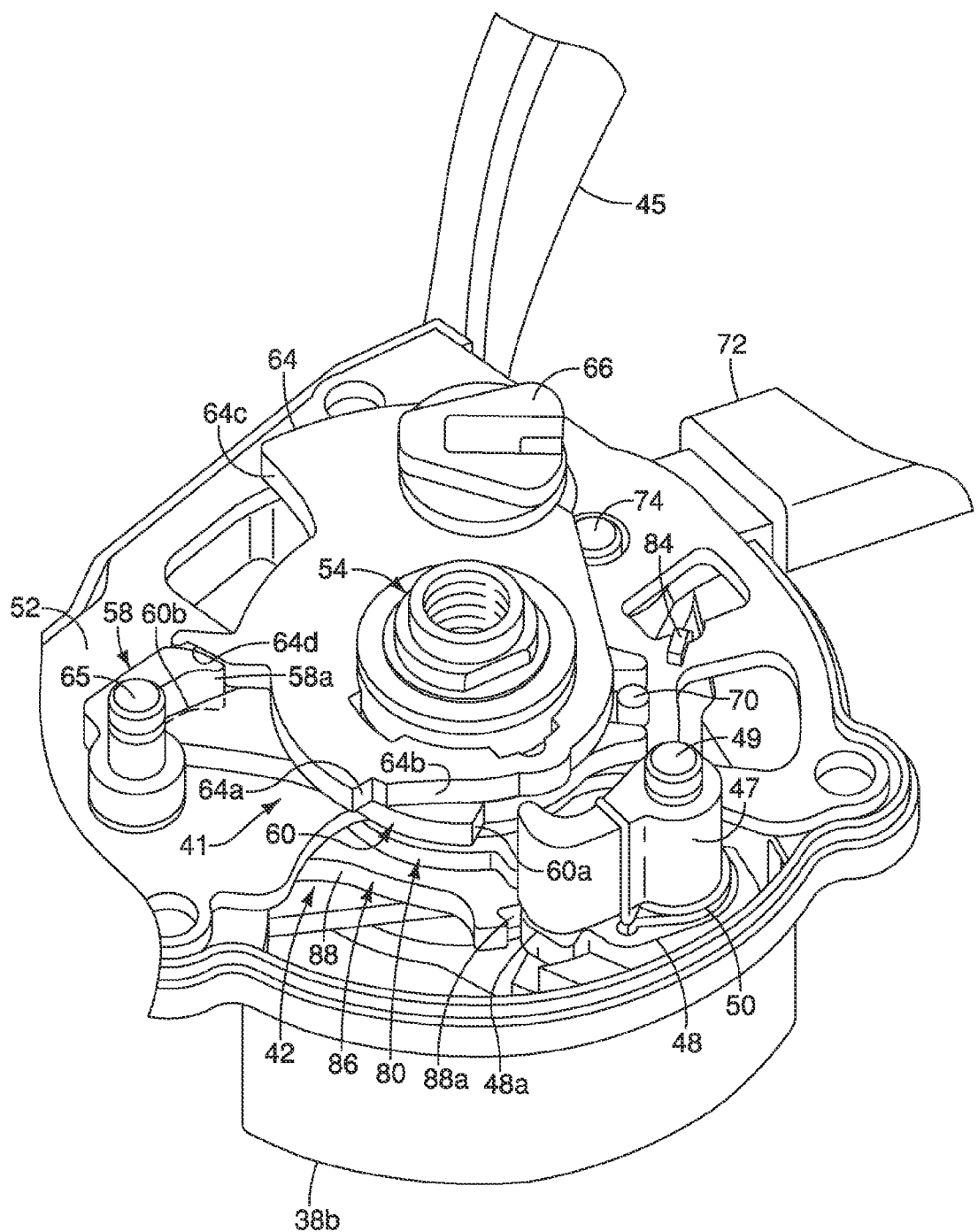
FIG. 31 is an enlarged top perspective view of a selected portion of the bicycle control device illustrated in FIG. 30 showing the first wire take-up member in a take-up position and the remaining parts in their rest positions.
Figure 32:
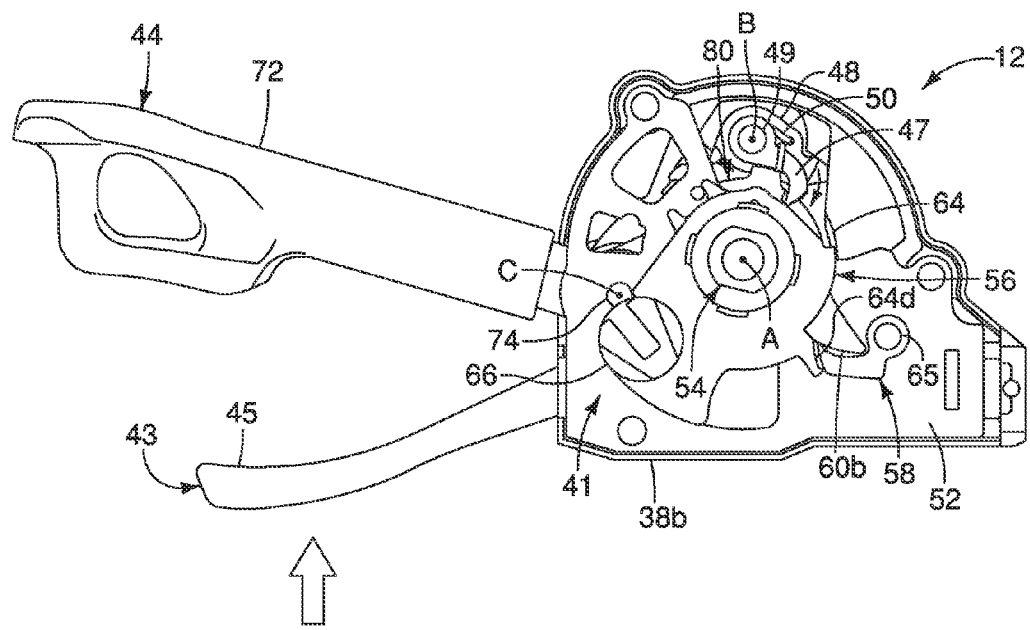
FIG. 32 is a top view of selected internal parts of the first actuating unit of the bicycle control device illustrated in FIGS. 3 and 4, but with the operating lever having been moved from the rest position such that the first pulling member engages an abutment of the release member to start performing a first wire releasing operation without moving the first wire take-up member, which is in the take-up position.
Figure 33:
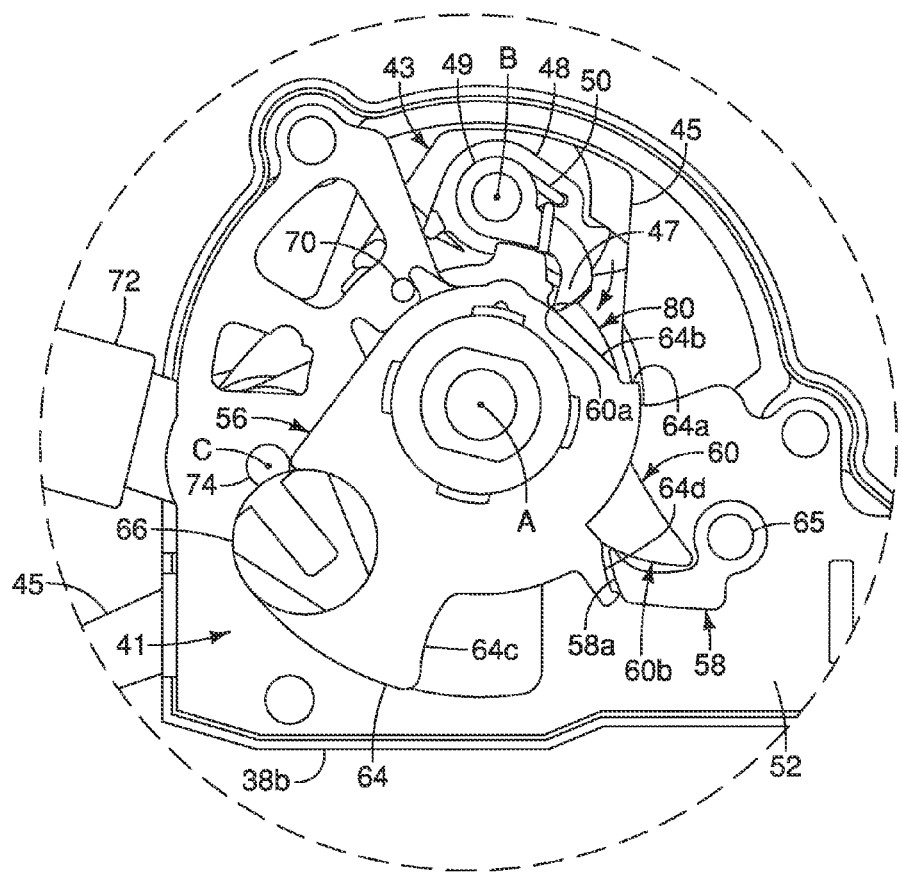
FIG. 33 is an enlarged top view of a selected portion of the bicycle control device illustrated in FIG. 32.
Figure 34:
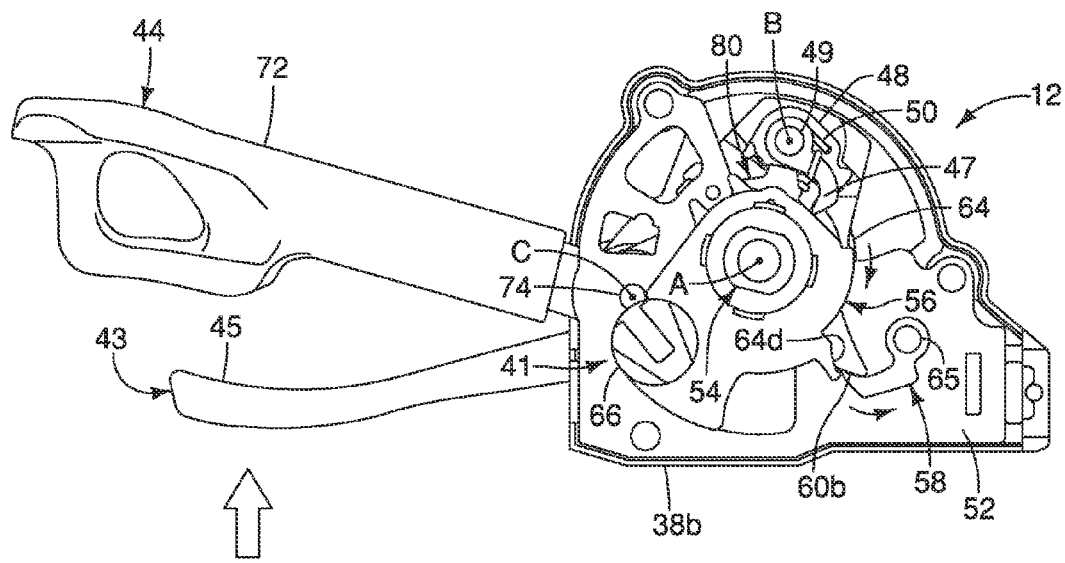
FIG. 34 is a top view, similar to FIG. 32, of selected internal parts of the first actuating unit of the bicycle control device illustrated in FIGS. 3 and 4, but with the operating lever having been moved further from the rest position than in FIG. 32 to pivot the release member, which pivots the position maintaining member from the holding position towards the releasing position without moving the first wire take-up member, which is in the take-up position.
Figure 35:
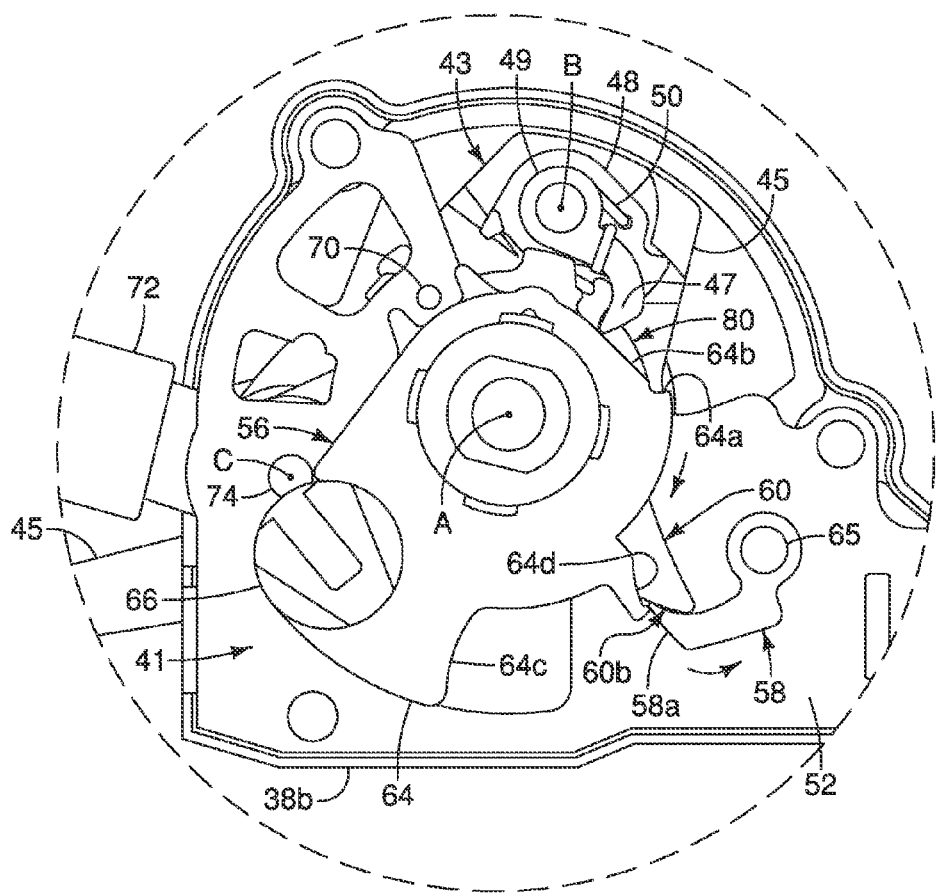
FIG. 35 is an enlarged top view of a selected portion of the bicycle control device illustrated in FIG. 34.
Figure 36:
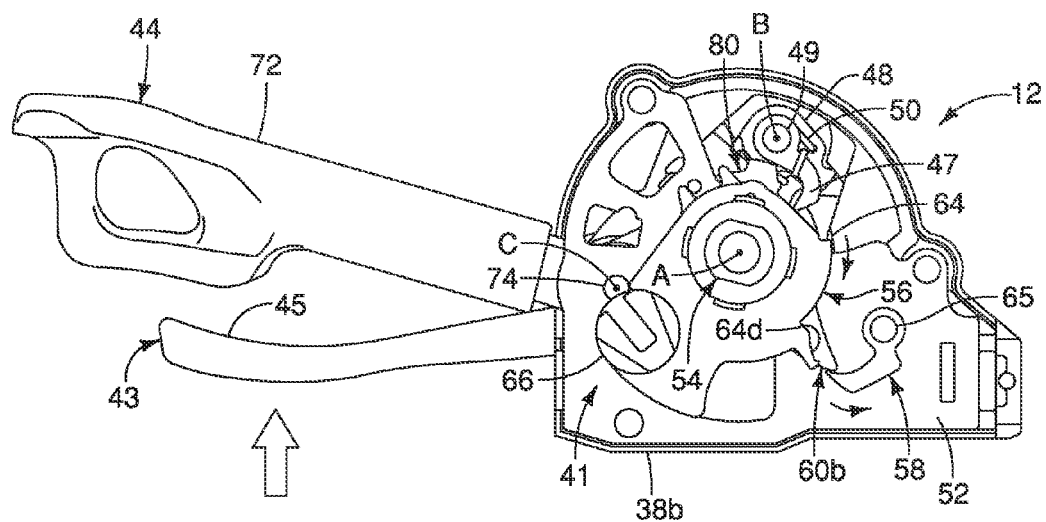
FIG. 36 is a top view, similar to FIGS. 32 and 34, of selected internal parts of the first actuating unit of the bicycle control device illustrated in FIGS. 3 and 4, but with the operating lever having been moved further from the rest position than in FIG. 34 such that the release member holds the position maintaining member in the releasing position to release the first wire take-up member, which is still shown in the take-up position.
Figure 37:
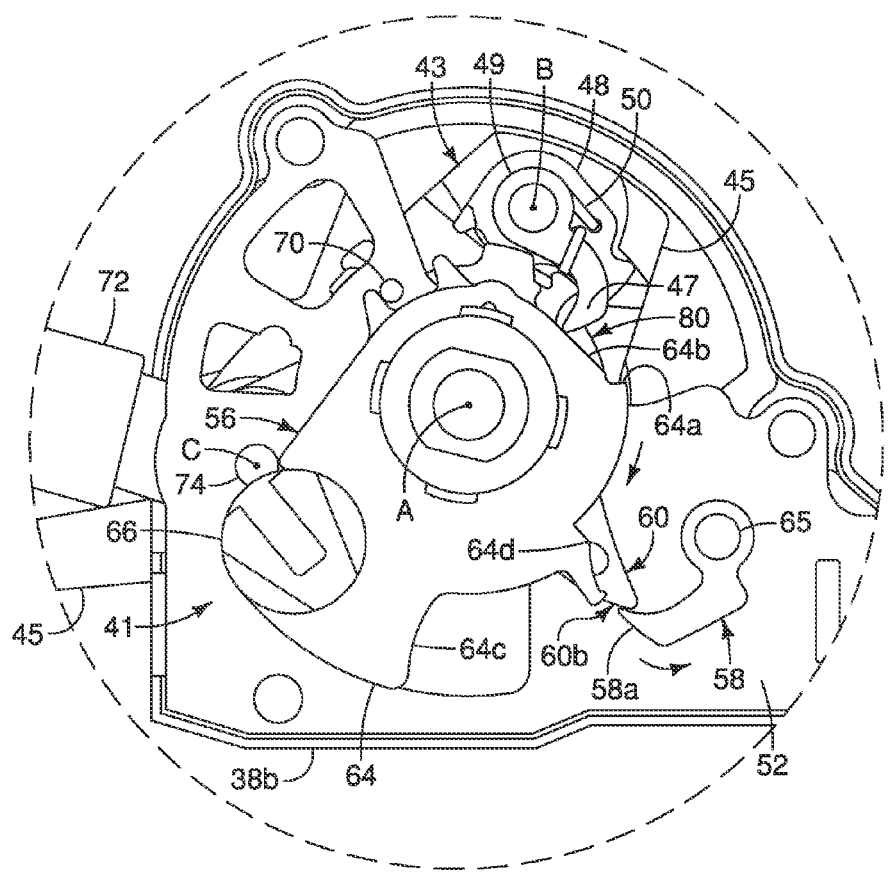
FIG. 37 is an enlarged top view of a selected portion of the bicycle control device illustrated in FIG. 36.
Figure 38:
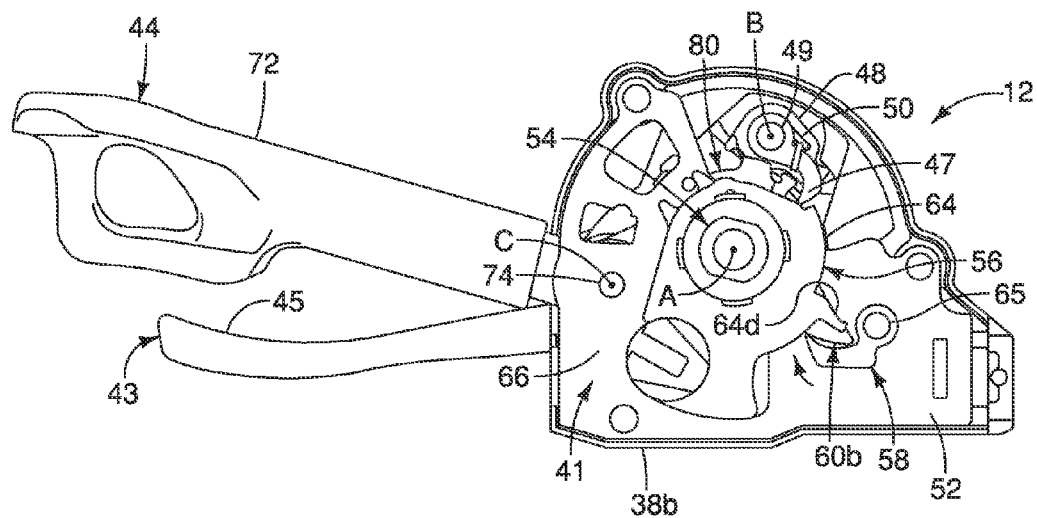
FIG. 38 is a top view, similar to FIGS. 32, 34 and 36, of selected internal parts of the first actuating unit of the bicycle control device illustrated in FIGS. 3 and 4, but with the first wire take-up member moving towards the rest position.
Figure 39:
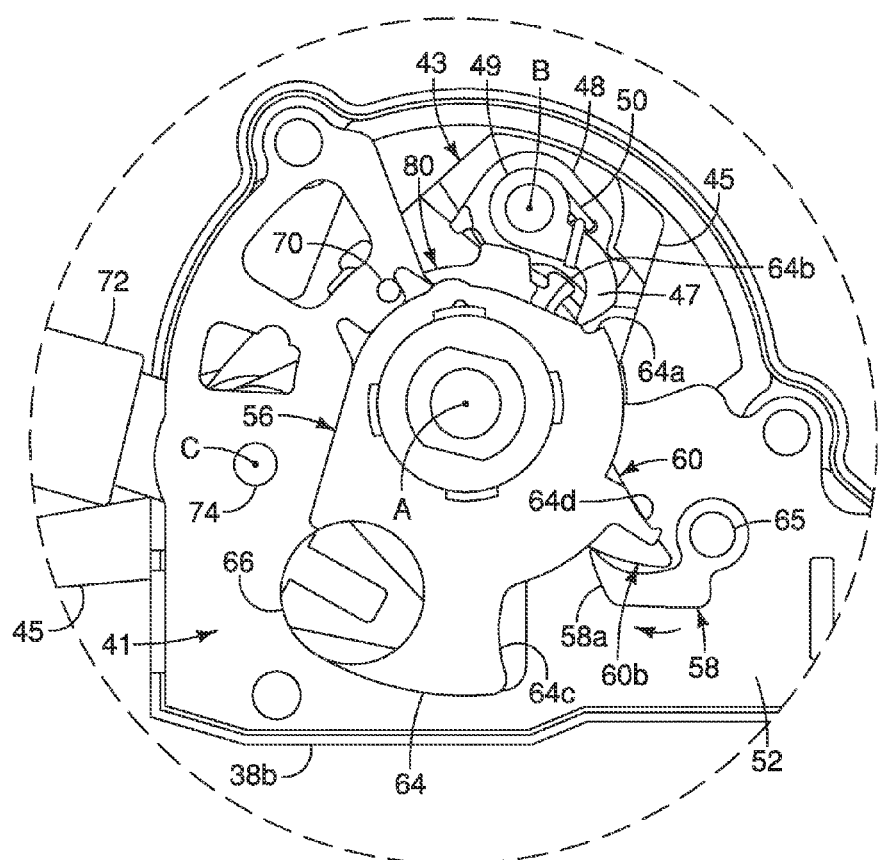
FIG. 39 is an enlarged top view of a selected portion of the bicycle control device illustrated in FIG. 38.
Figure 40:
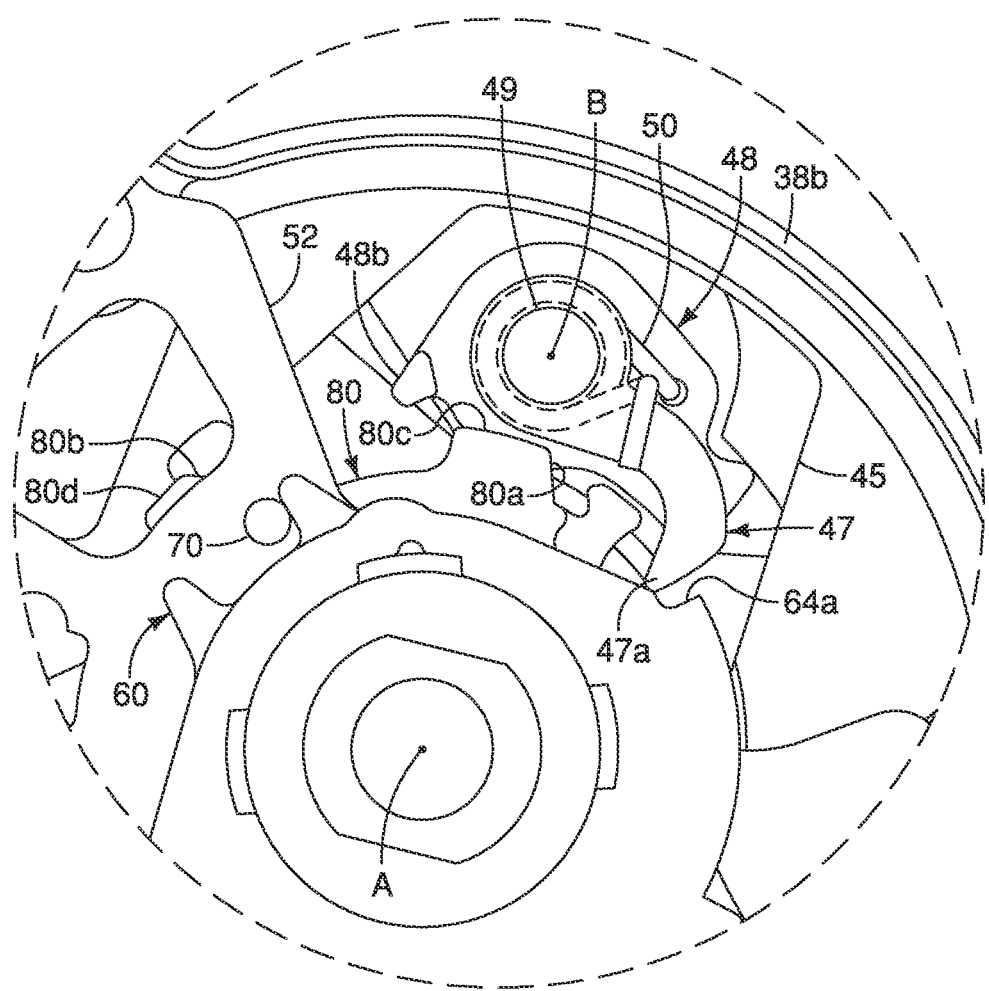
FIG. 40 is a further enlarged top view of part of the selected portion of the bicycle control device illustrated in FIG. 39.
Figure 41:
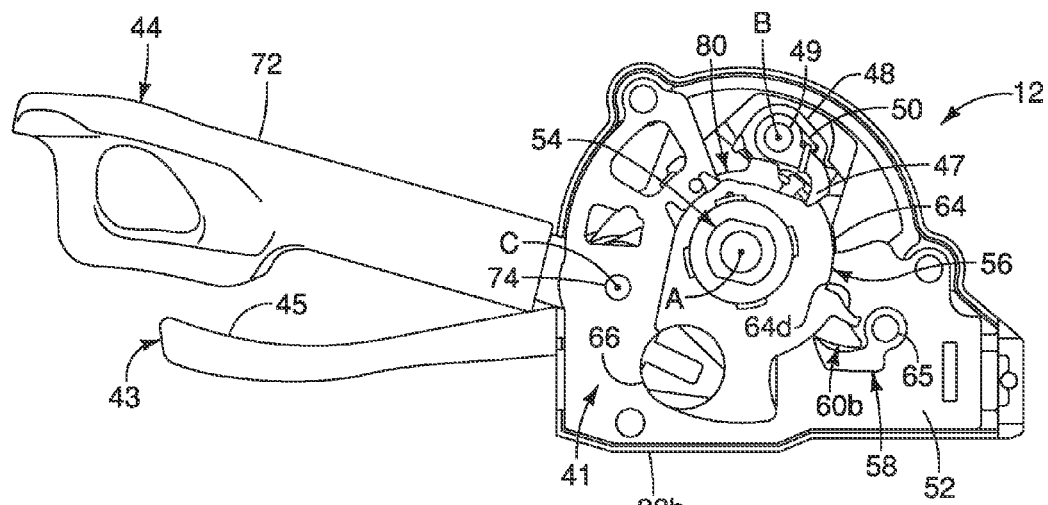
FIG. 41 is a top view, similar to FIGS. 32, 34, 36 and 38, of selected internal parts of the first actuating unit of the bicycle control device illustrated in FIGS. 3 and 4, but with the first wire take-up member moved to the rest position where the first wire take-up member abuts against the pulling member.
Figure 42:
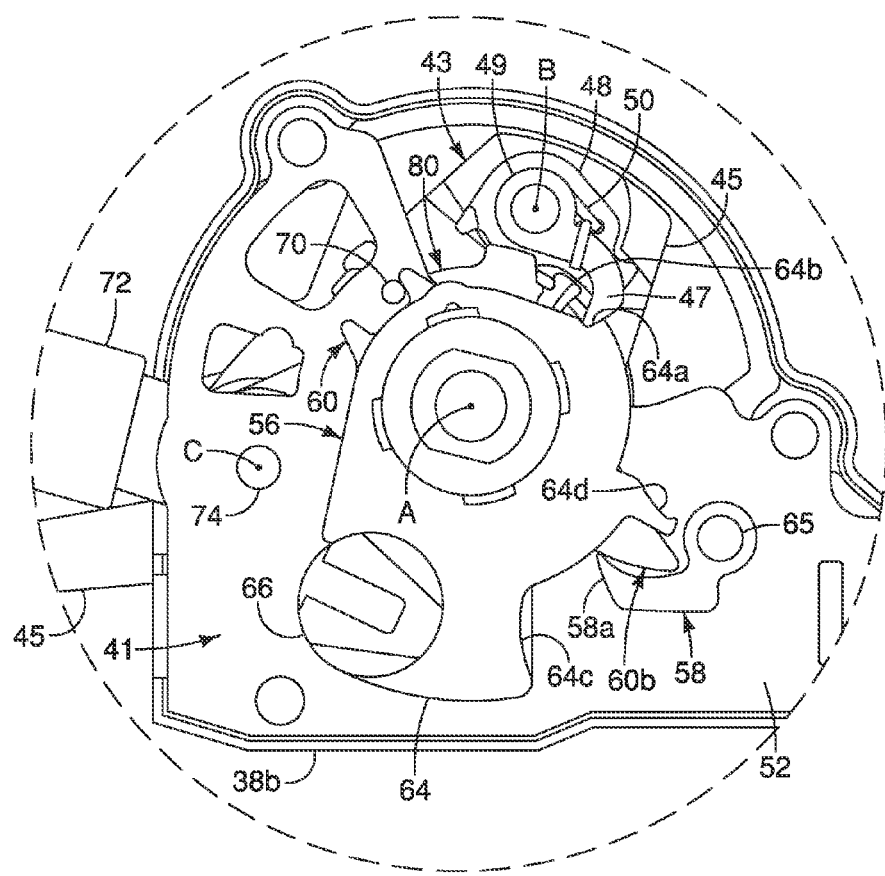
FIG. 42 is an enlarged top view of a selected portion of the bicycle control device illustrated in FIG. 41.
Figure 43:
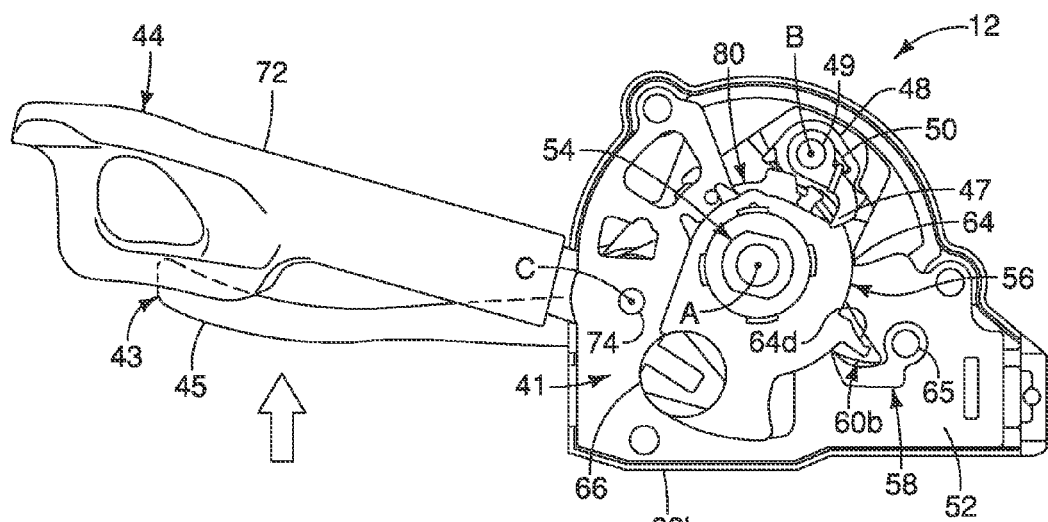
FIG. 43 is a top view, similar to FIGS. 32, 34, 36, 38 and 41, of selected internal parts of the first actuating unit of the bicycle control device illustrated in FIGS. 3 and 4, but with the operating lever being operated further away from the rest position from the operated position shown in FIG. 41.
Figure 44:
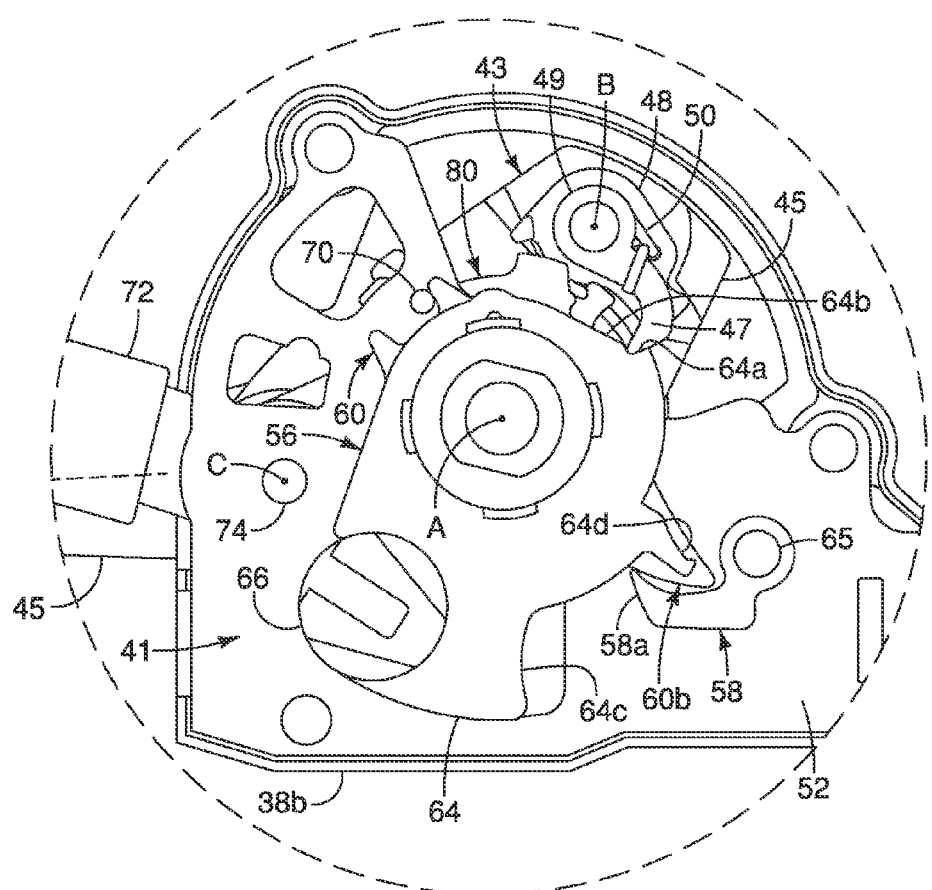
FIG. 44 is an enlarged top view of a selected portion of the bicycle control device illustrated in FIG. 43.
Figure 45:
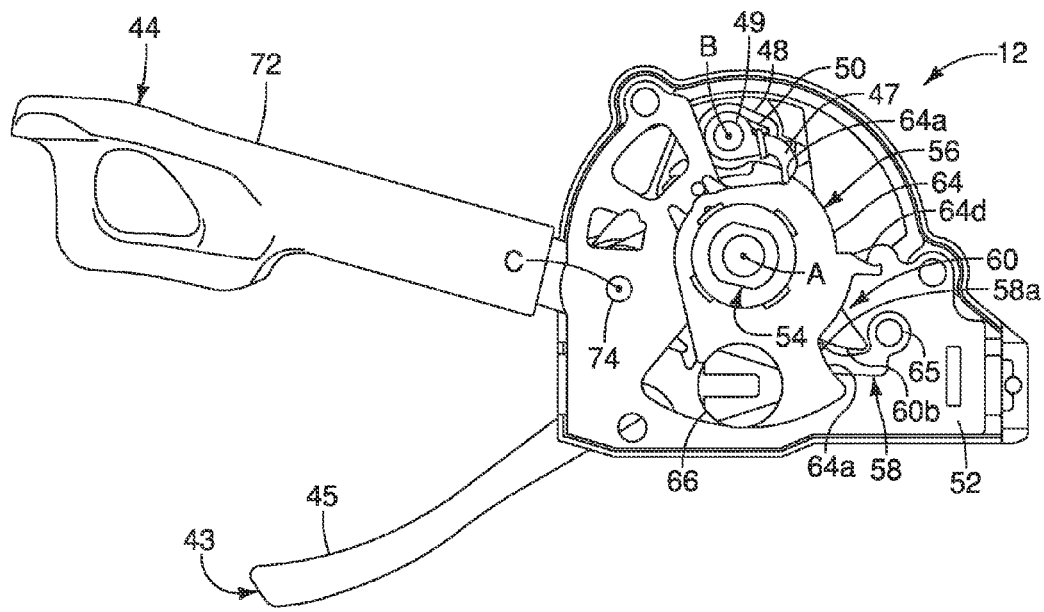
FIG. 45 is a top view, similar to FIGS. 32, 34, 36, 38, 41 and 43, of selected internal parts of the first actuating unit of the bicycle control device illustrated in FIGS. 3 and 4, but with the first wire take-up member and the remaining parts returned to their rest positions by releasing the operating lever from the state shown in FIG. 43.
Figure 46:
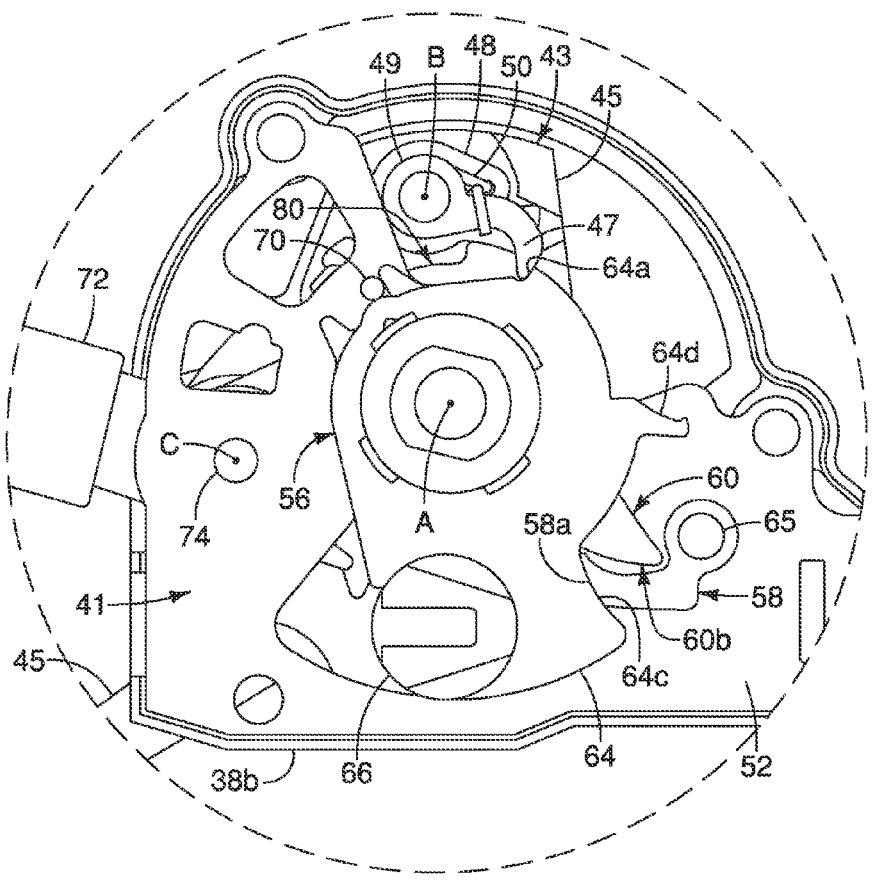
FIG. 46 is an enlarged top view of a selected portion of the bicycle control device illustrated in FIG. 45.

Referring to FIGS. 30 to 46, the bicycle control device 12 is illustrated in which the first actuating unit 41 performs a wire releasing operation of the first control cable 31 by operating the first lever member 45. FIGS. 30 and 31 show the first wire take-up member 56 in a take-up position and the remaining parts in their rest positions. FIGS. 32 to 46 show the selected parts of the bicycle control device 12 be sequentially moved as the first lever member 45 is pivoted from die non-operated (rest) position to the operated position and then back to the non-operated (rest) position to perform the wire releasing operation of the first control cable 31.

Basically, during the wire releasing operation of the first control cable 31 by operating the first lever member 45, the tooth 47a of the first pulling member 47 engages the second engagement surface 60a of the release member 60 to rotate the release member 60. Because the first engagement surface 64a is offset from the second engagement surface 60a in the take-up direction R1 when the first wire take-up member 56 is in the take-up position, the tooth 47a does not engage with the first engagement surface 64a. As the release member 60 rotates, the cam surface 60b pivots the position maintaining member 58 about its pivot axis to the releasing position to release the first wire take-up member 56 so that it returns to the rest position by the biasing force of the first biasing element 61. Upon releasing the first lever member 45, the release member 60 returns to the rest position and the position maintaining member 58 pivots about its pivot axis to the holding position to abut against the first positioning abutment 64c. Thus, the position maintaining member 58 holds the first wire take-up member 56 in the rest position.

Figure 47:
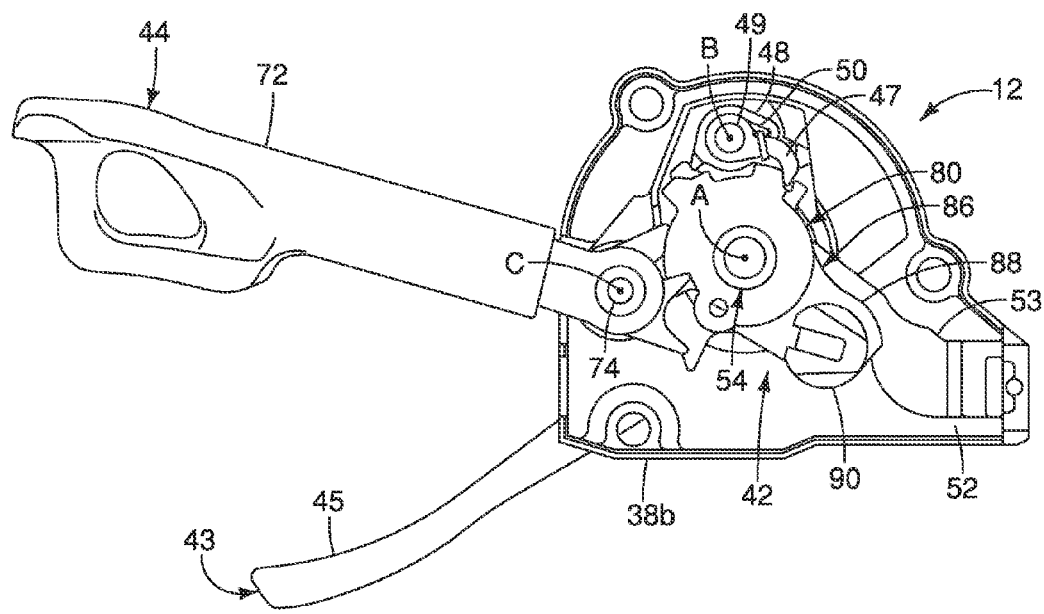
FIG. 47 is a top view of selected internal parts of the second actuating unit of the bicycle control device illustrated in FIGS. 3 and 4, with the internal parts of the bicycle control device in their rest positions.
Figure 48:
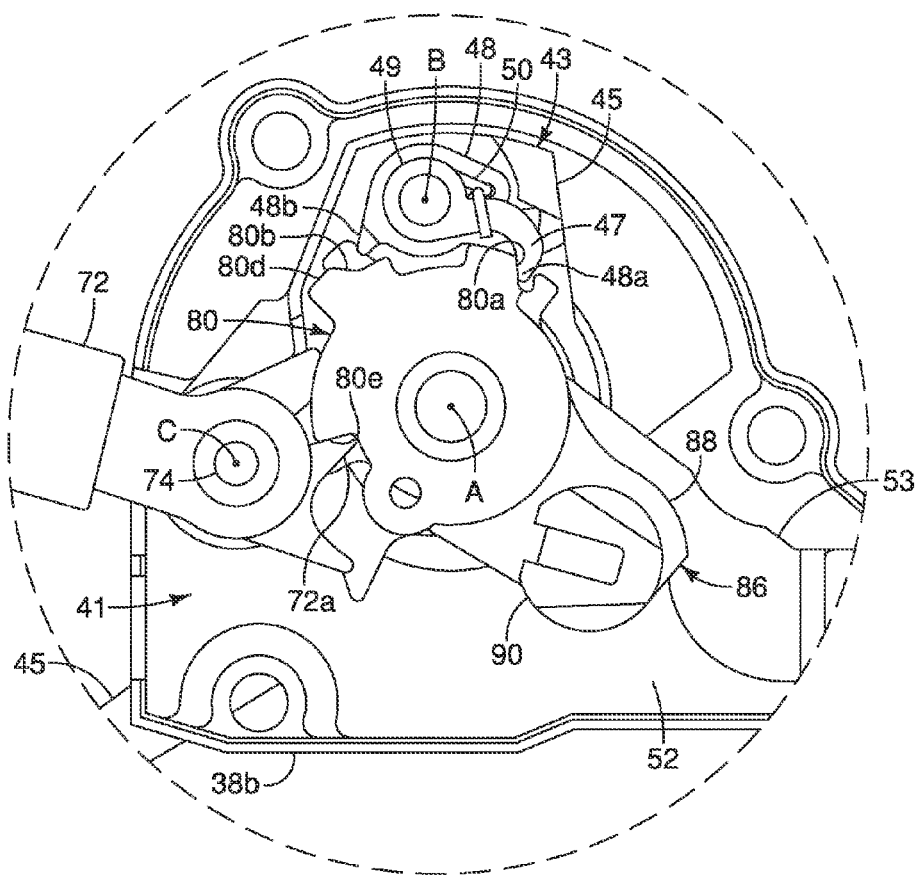
FIG. 48 is an enlarged top view of a selected portion of the bicycle control device illustrated in FIG. 47.
Figure 49:
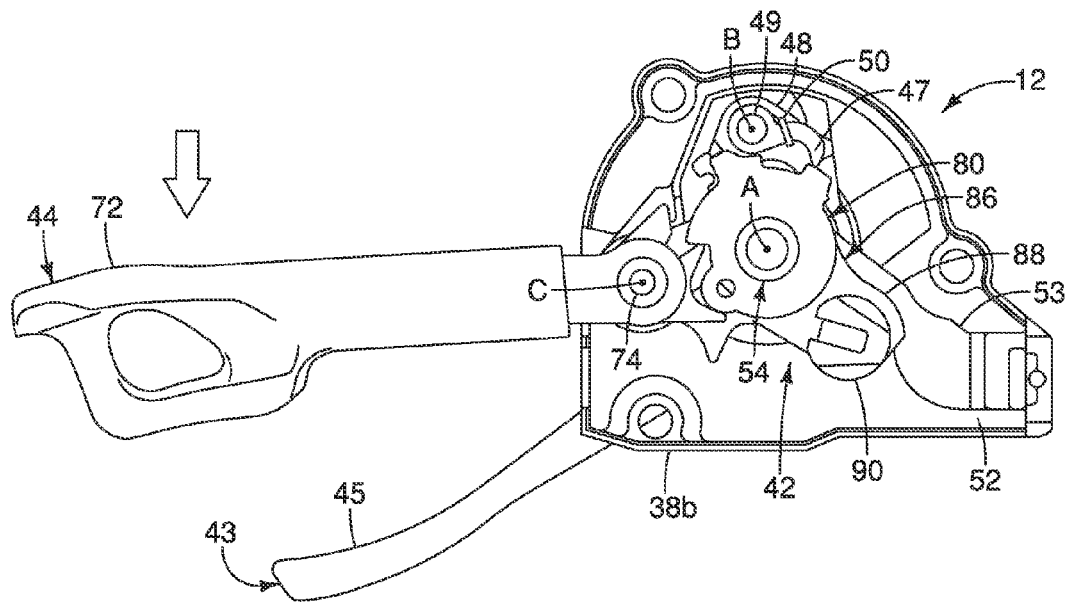
FIG. 49 is a top view, similar to FIG. 47, of selected internal parts of the second actuating unit of the bicycle control device illustrated in FIGS. 3 and 4, but with the changing member moved from the rest (first) position of FIG. 47 towards the second position such that the cam member moves the first pulling member out of the path of the first wire take-up member and moves the second pulling member into the path of the second wire take-up member.
Figure 50:
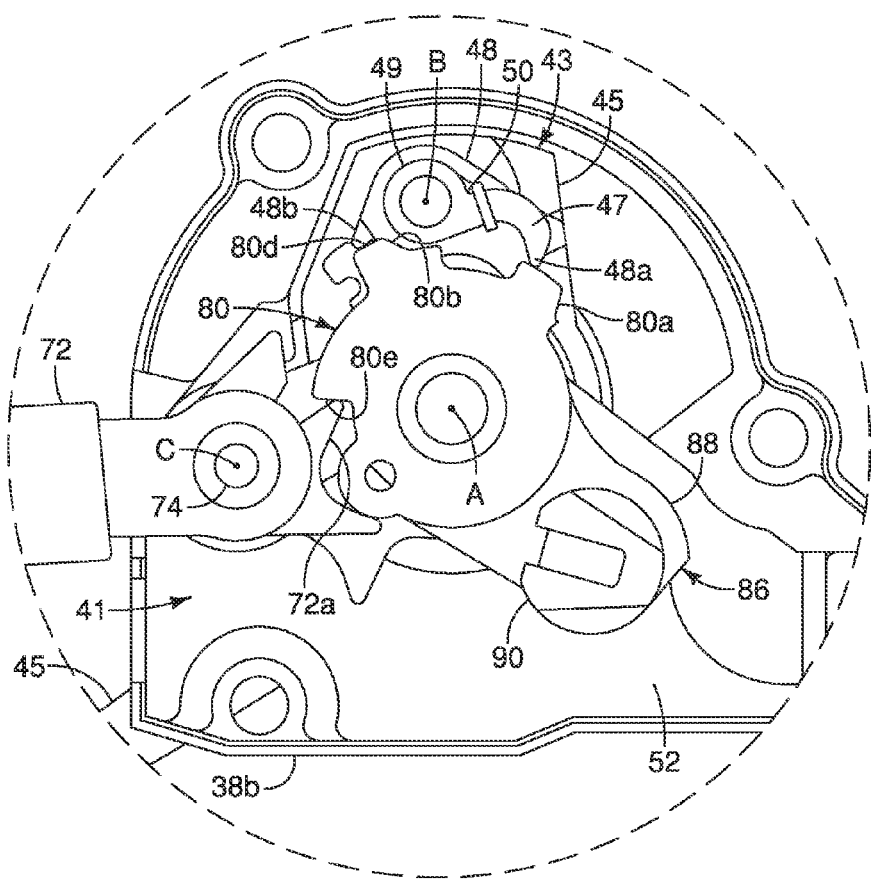
FIG. 50 is an enlarged top view of a selected portion of the bicycle control device illustrated in FIG. 49.
Figure 51:
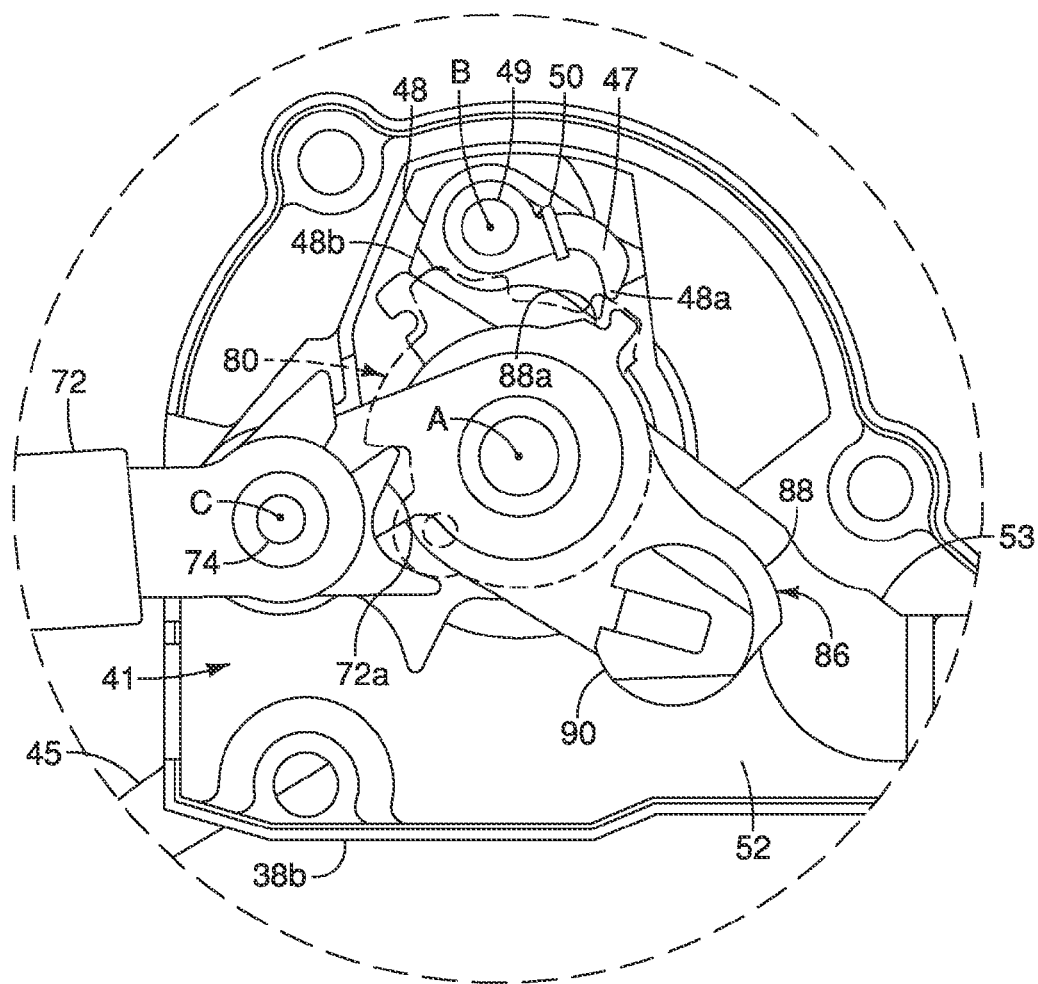
FIG. 51 is an enlarged top view, similar to FIG. 50, of the selected portion of the bicycle control device illustrated in FIG. 49, but with the cam member shown in broken lines.
Figure 52:
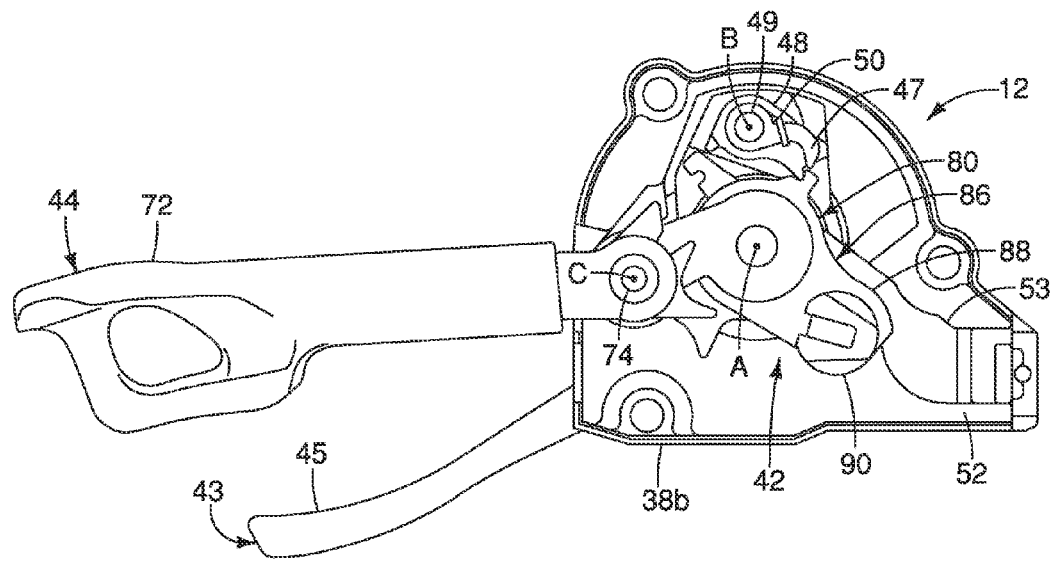
FIG. 52 is a top view of selected internal parts of the second actuating unit of the bicycle control device illustrated in FIGS. 3 and 4, but with the changing member moved further from the rest (first) position than in FIG. 49 towards the second position such that the second pulling member engages the second wire take-up member.
Figure 53:
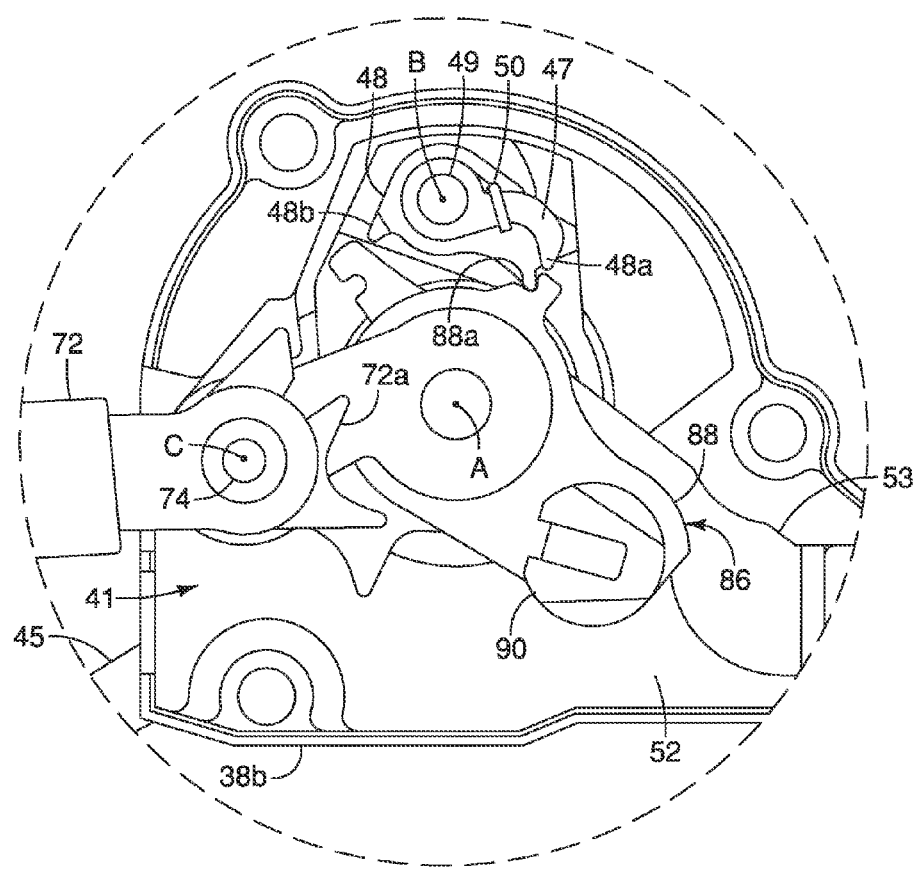
FIG. 53 is an enlarged top view of a selected portion of the bicycle control device illustrated in FIG. 52.
Figure 54:
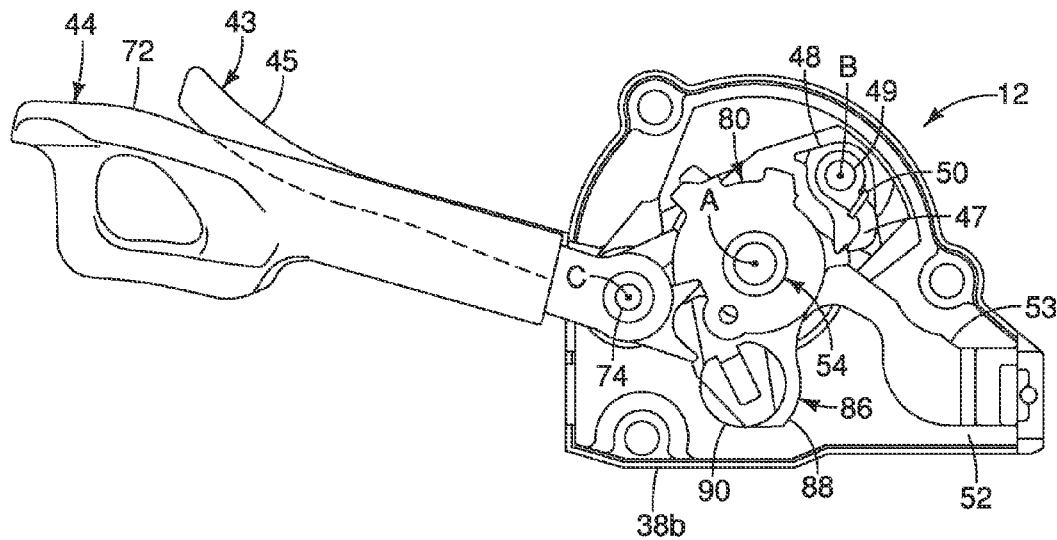
FIG. 54 is a top view of selected internal parts of the second actuating unit of the bicycle control device illustrated in FIGS. 3 and 4, but with the changing member moved to the second position such that the second wire take-up member is moved to the take-up position.
Figure 55:
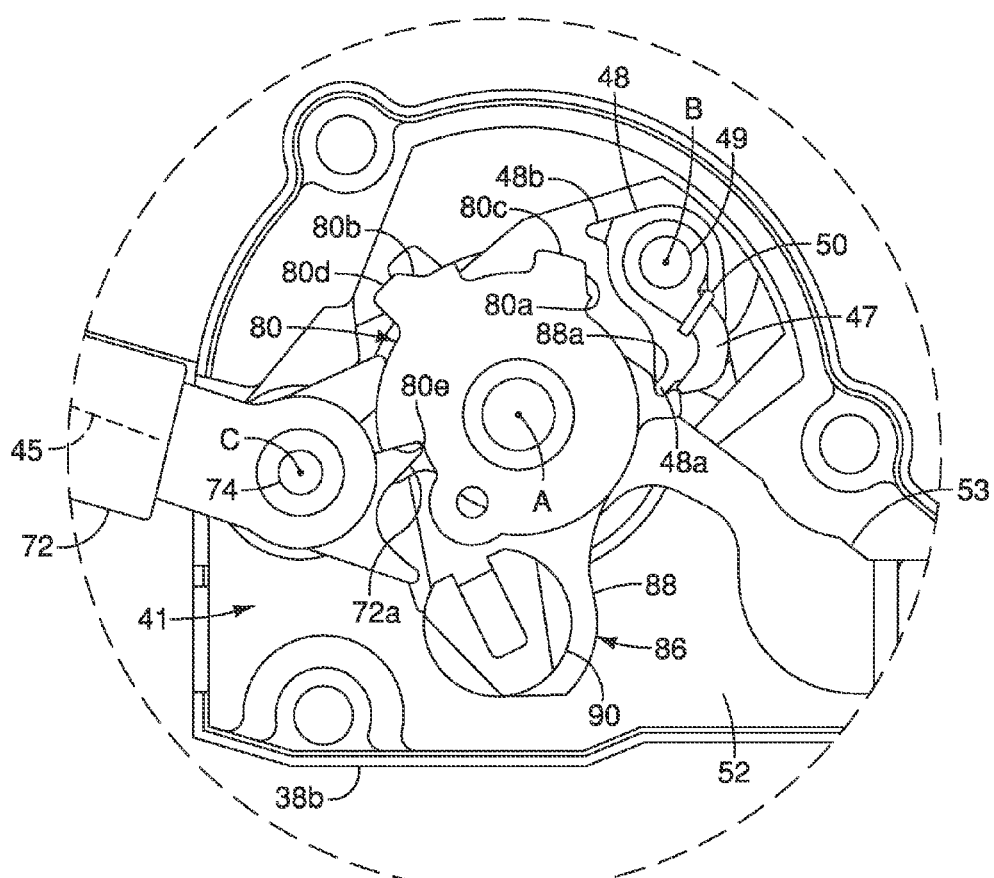
FIG. 55 is an enlarged top view of a selected portion of the bicycle control device illustrated in FIG. 54.
Figure 56:
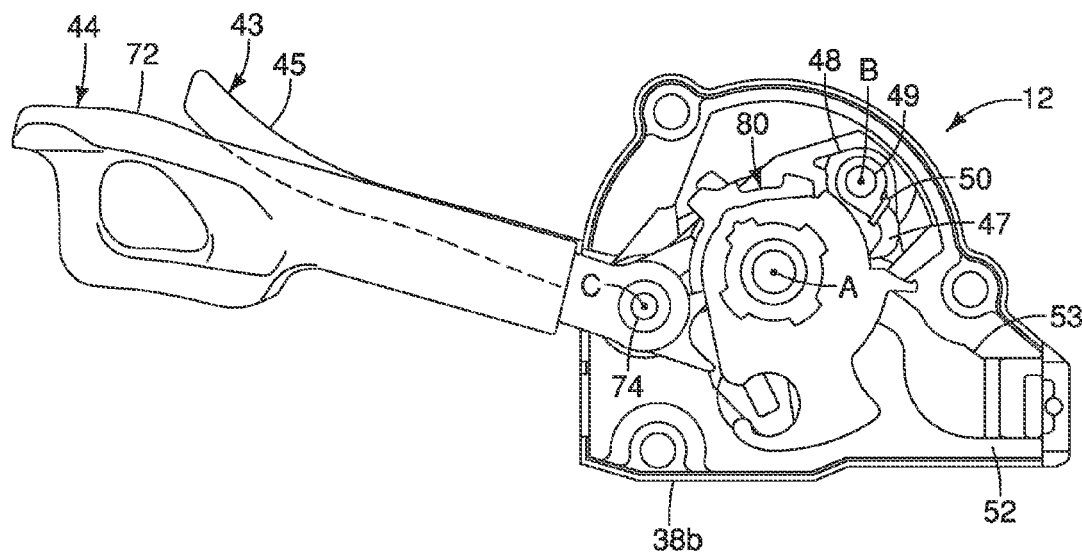
FIG. 56 is a top view, of selected internal parts of the second actuating unit of the bicycle control device illustrated in FIGS. 3 and 4, but illustrating the first pulling member (e.g., the first pulling pawl in the illustrated embodiment) contact the outer peripheral edge of the control part of the first wire take-up member.
Figure 57:
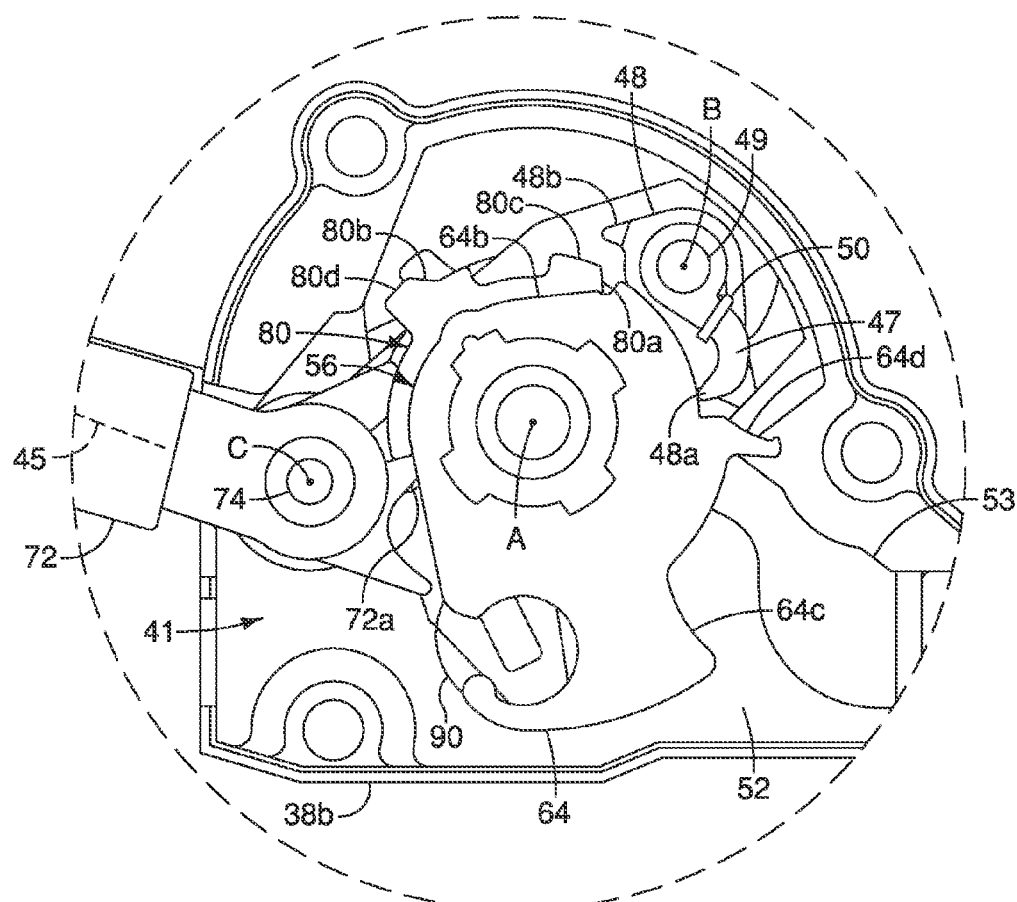
FIG. 57 is an enlarged top view of a selected portion of the bicycle control device illustrated in FIG. 56.

Referring to FIGS. 47 to 57, the bicycle control device 12 is illustrated in which the second actuating unit 42 performs a wire pulling operation of the second control cable 32 by pivoting the second lever member 72 from the first (non-operated) position to the second (operated) position, and then subsequently operating the first lever member 45 while the second lever member 72 is at least initially in the second (operated) position. FIGS. 47 and 48 show selected parts of the bicycle control device 12 that pertain second actuating unit 42 in their rest positions. FIGS. 49 to 57 show the selected parts of the bicycle control device 12 be sequentially moved as the second lever member 72 is pivoted from the first (non-operated) position to the second (operated) position (see FIGS. 49 to 51), and then the first lever member 45 is subsequently operated while the second lever member 72 is at least initially in the second (operated) position (see FIGS. 52 to 55). FIGS. 56 and 57 show the state of the first wire take-up member 56 while the first lever member 45 is in the second (operated) position (see FIGS. 52 to 55) during the wire pulling operation of the second control cable 32.

Basically, the second actuating unit 42 is operated by the first lever member 45 to perform the wire pulling operation of the second control cable 32. However, first, a switching operation must be performed for selecting the second actuating unit 42 to be operated. In particular, when the second lever member 72 is pivoted on the second axle 74, the projection 72a engages the abutment 80e of the cam member 80 to pivot the cam member 80 about the first axle 54. This pivoting of the cam member 80 causes the first cam surface 80a to engage the tooth 47a of the first pulling member 47 so as to pivot the first pulling member 47 on the pivot axle 49 about the pivot axis B. After a small amount of pivotal moment of the cam member 80, the second cam surface 80b contacts the projection 48b of the second pulling member 48 so as to pivot the second pulling member 48 on the pivot axle 49 about the pivot axis B. Pivoting of the cam member 80 by the second lever member 72 results in the tooth 47a of the first pulling member 47 being pivoted away from the first wire take-up member 56 and the tooth 48a of the second pulling member 48 being engaged with the engagement surface 88a to pivot the second wire take-up member 86 in the take-up direction R1 about the pulling axis A.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle control device. Accordingly, these directional terms, as utilized to describe the bicycle control device should be interpreted relative to a bicycle in an upright riding position on a horizontal surface and that is equipped with the bicycle control device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device for operating a first bicycle component and a second bicycle component of a bicycle, the bicycle control device comprising:
    a clamp configured to be mounted to the bicycle;
    a first bicycle component actuator configured to be connected to the first bicycle component;
    a second bicycle component actuator configured to be connected to the second bicycle component;
    a single operating lever movably coupled to the clamp and operatively coupled to the first and second bicycle component actuators to selectively operate the first and second bicycle component actuators; and
    a mechanical switch movably coupled to the clamp to selectively switch between the first and second bicycle component actuators being operated in response to movement of the operating lever,
    the first bicycle component actuator including a first wire take-up member and a release member, and
    the second bicycle component actuator including a second wire take-up member and a cable attachment part.

2. The bicycle control device according to claim 1, wherein
    the mechanical switch is movably arranged between a first position and a second position, such that the operating lever operates the first bicycle component actuator when the mechanical switch is in the first position and operates the second bicycle component actuator when the mechanical switch is in the second position.

3. The bicycle control device according to claim 2, wherein
    the mechanical switch is biased towards the first position which corresponds to a rest position of the mechanical switch.

4. The bicycle control device according to claim 1, wherein
    the operating lever includes a first pawl arranged to engage the first wire take-up member and a second pawl arranged to engage the second wire take-up member.

5. The bicycle control device according to claim 4, wherein
    the mechanical switch changes a state of engagement between the first pawl and the first wire take-up member, and changes a state of engagement between the second pawl and the second wire take-up member.

6. The bicycle control device according to claim 4, wherein
    the first and second wire take-up members are pivotally mounted with respect to the clamp about a single pulling axis.

7. The bicycle control device according to claim 6, wherein
    the operating lever comprises a first lever member pivotally mounted about the pulling axis, and the mechanical switch comprises a second lever member pivotally mounted about an axis that is offset from and parallel to the pulling axis.

8. The bicycle control device according to claim 7, wherein
the first and second lever members extends toward an end of a handlebar along longitudinal direction of the handlebar, the second lever member is longer than the first lever member in a state in which the clamp is mounted to the handlebar.

9. The bicycle control device according to claim 4, wherein
the first pawl and the second pawl are pivotally mounted about a pivot axis and are arranged to pivot independently of each other.

10. The bicycle control device according to claim 9, wherein
the first pawl is biased towards the first wire take-up member, and
the second pawl is biased away from the second wire take-up member.

11. The bicycle control device according to claim 10, wherein
the mechanical switch includes a cam member that pivots the first pawl and the second pawl in opposite directions about the pivot axis upon operation of the mechanical switch.

12. The bicycle control device according to claim 4, wherein
the mechanical switch includes a cam member that engages and moves the first pawl and the second pawl upon operation of the mechanical switch.

13. The bicycle control device according to claim 4, wherein
the mechanical switch and the first and second wire take-up members are pivotally mounted about a single pulling axis.

14. The bicycle control device according to claim 13, wherein
the mechanical switch includes a cam member that engages and moves the first pawl and the second pawl upon operation of the second lever member.

15. The bicycle control device according to claim 14, wherein
the mechanical switch is pivotally mounted about the pulling axis.

16. The bicycle control device according to claim 1, wherein
the first bicycle component actuator is configured to be connected to a derailleur as the first bicycle component, and
the second bicycle component actuator is configured to be connected to one of a suspension adjustment mechanism and a height adjustable seatpost as the second bicycle component.

17. The bicycle control device according to claim 1, wherein
the first bicycle component actuator is configured to be connected to the first bicycle component via a control cable, and
the operating lever is configured to operate the first bicycle component actuator to pull and release the control cable.

18. The bicycle control device according to claim 1, wherein
the operating lever is configured to operate the first and second bicycle component actuators to selectively operate the first and second bicycle component actuators upon movement of the operating lever in a first direction.

19. A bicycle control device for operating a first bicycle component and a second bicycle component of a bicycle, the bicycle control device comprising:
a clamp configured to be mounted to the bicycle;
a first bicycle component actuator configured to be connected to the first bicycle component via a control cable;
a second bicycle component actuator configured to be connected to the second bicycle component; and
a single operating lever movably coupled to the clamp and operatively coupled to the first and second bicycle component actuators to selectively operate the first and second bicycle component actuators,
the operating lever being configured to operate the first bicycle component actuator to pull and release the control cable,
the first bicycle component actuator including a first wire take-up member and a release member, and
the second bicycle component actuator including a second wire take-up member and a cable attachment part.

20. A bicycle control device for operating a first bicycle component and a second bicycle component of a bicycle, the bicycle control device comprising:
a clamp configured to be mounted to the bicycle;
a first bicycle component actuator configured to be connected to the first bicycle component via a control cable;
a second bicycle component actuator configured to be connected to the second bicycle component; and
a single operating lever pivotally coupled to the clamp and operatively coupled to the first and second bicycle component actuators to selectively operate the first and second bicycle component actuators upon movement of the operating lever in a first direction,
the first bicycle component actuator including a first wire take-up member and a release member, and
the second bicycle component actuator including a second wire take-up member and a cable attachment part.

* * * * *